US012552027B1

(12) United States Patent
Raaj et al.

(10) Patent No.: US 12,552,027 B1
(45) Date of Patent: Feb. 17, 2026

(54) GENERATING REFERENCES FOR ROBOT-CARRIED OBJECTS AND RELATED TECHNOLOGY

(71) Applicant: Agility Robotics, Inc., Pittsburgh, PA (US)

(72) Inventors: Yaadhav Raaj, Beaverton, OR (US); Juan Fernando Medrano Yax, Guatemala City (GT)

(73) Assignee: Agility Robotics, Inc., Salem, OR (US)

( * ) Notice: Subject to any disclaimer, the term of this patent is extended or adjusted under 35 U.S.C. 154(b) by 309 days.

(21) Appl. No.: 18/507,506

(22) Filed: Nov. 13, 2023

Related U.S. Application Data

(60) Provisional application No. 63/589,578, filed on Oct. 11, 2023, provisional application No. 63/584,068, filed on Sep. 20, 2023.

(51) Int. Cl.
*B25J 9/16* (2006.01)
*B25J 5/00* (2006.01)

(52) U.S. Cl.
CPC .............. *B25J 9/1661* (2013.01); *B25J 5/00* (2013.01); *B25J 9/161* (2013.01)

(58) Field of Classification Search
CPC ............. B25J 9/1661; B25J 5/00; B25J 9/161
See application file for complete search history.

(56) References Cited

U.S. PATENT DOCUMENTS

| | | | |
|---|---|---|---|
| 7,221,983 B2 | 5/2007 | Watanabe | |
| 7,236,618 B1 | 6/2007 | Chui | |
| 7,236,854 B2 | 6/2007 | Pretlove | |
| 8,996,175 B2 | 3/2015 | Blumberg et al. | |
| 12,454,065 B1* | 10/2025 | Raaj | B25J 13/089 |
| 2007/0001638 A1 | 1/2007 | Gray | |
| 2007/0106421 A1 | 5/2007 | Kamrani | |
| 2018/0039848 A1* | 2/2018 | Konolige | G06T 17/00 |
| 2021/0023715 A1 | 1/2021 | Zhang | |

(Continued)

OTHER PUBLICATIONS

Hebert, Paul, et al. "Fusion of stereo vision, force-torque, and joint sensors for estimation of in-hand object location." 2011 IEEE International Conference on Robotics and Automation. IEEE, 2011 (Year: 2011).

(Continued)

*Primary Examiner* — Wade Miles
*Assistant Examiner* — Zachary Joseph Wallace

(57) ABSTRACT

A method in accordance with a particular embodiment of the present technology includes retrieving an object from a starting location by grasping the object between two end effectors of a mobile robot. The method further includes generating, by data-processing hardware operably associated with the mobile robot, an object reference corresponding to a pose of the object at a time after retrieving the object and while the object is in contact with the end effectors. Generating the object reference is based at least partially on perception data corresponding to the object and includes generating a three-dimensional reference corresponding to a feature of the object based at least partially on a two-dimensional estimate from a neural network and a three-dimensional reference corresponding to a different feature of the object. Finally, the method includes controlling the mobile robot based at least partially on the object reference.

20 Claims, 19 Drawing Sheets

(56) References Cited

U.S. PATENT DOCUMENTS

| | | | |
|---|---|---|---|
| 2021/0122045 A1 | 4/2021 | Handa et al. | |
| 2021/0129333 A1 | 5/2021 | Kanunikov | |
| 2021/0178593 A1 | 6/2021 | Ye | |
| 2021/0220997 A1* | 7/2021 | Unno | B25J 9/1694 |
| 2021/0339399 A1* | 11/2021 | Schluntz | G05D 1/0088 |
| 2023/0071384 A1 | 3/2023 | Agarwal | |
| 2023/0182293 A1 | 6/2023 | Shaw | |
| 2023/0398692 A1* | 12/2023 | Kollar | H04N 13/128 |
| 2024/0187203 A1* | 6/2024 | Neerbek | H04W 56/0085 |
| 2024/0198515 A1 | 6/2024 | Aparicio Ojea | |
| 2024/0359927 A1* | 10/2024 | Li | B65G 61/00 |
| 2024/0416510 A1* | 12/2024 | Aguirre | B25J 9/1612 |
| 2025/0214261 A1* | 7/2025 | Chen | B25J 9/1075 |

OTHER PUBLICATIONS

Gelfand, Natasha, et al. "Geometrically stable sampling for the ICP algorithm." Fourth International Conference on 3-D Digital Imaging and Modeling, 2003. 3DIM 2003. Proceedings.. IEEE, 2003 (Year: 2003).

* cited by examiner

TWO-DIMENSIONAL INFORMATION

ANNOTATIONS FROM NEURAL NETWORK

GENERATING REFERENCES FOR ROBOT-CARRIED OBJECTS AND RELATED TECHNOLOGY

CROSS-REFERENCE TO RELATED APPLICATION

This claims the benefit of: (1) U.S. Provisional Application No. 63/584,068, filed Sep. 20, 2023; and (2) U.S. Provisional Application No. 63/589,578, filed Oct. 11, 2023. The foregoing applications are incorporated herein by reference in their entirety. To the extent the foregoing applications or any other material incorporated by reference conflicts with the present disclosure, the present disclosure controls.

TECHNICAL FIELD

The present technology relates to object estimation in robotics.

BACKGROUND

Many simple tasks that humans currently perform are amenable to automation using robotics. Among such tasks are those involving moving goods between locations within distribution centers. For example, after a trailer containing goods arrives at a distribution center, human workers may move the goods from the trailer onto conveyors that carry the goods to other locations within the distribution center for further processing. Similarly, although conveyors can be used to deliver outgoing goods to loading docks and to palletizing stations at distribution centers, human workers are still needed to move the goods from the conveyors onto outgoing trailers and pallets. As another example, human workers at order-fulfillment distribution centers are often tasked with retrieving specific goods for last-mile delivery. Modern order-fulfillment distribution centers are massive and handle thousands of different goods. Even with the aid of sophisticated route optimization systems, locating and retrieving specific goods to fill orders as needed is labor intensive. Indeed, it is not uncommon for human workers at order-fulfillment distribution centers to walk ten or more miles a day. Despite the apparent simplicity of loading and unloading trailers and pallets and of retrieving specific goods for last-mile delivery, these tasks have conventionally been difficult or impossible to fully automate.

In the forgoing examples and in other cases, the use of human workers to perform repetitive and time-consuming tasks is inefficient. Human effort would be far better applied to more complex tasks, particularly those involving creativity and advanced problem solving. Presently, however, the need for distribution centers is large and rapidly increasing. Some analysts forecast a shortage of a million or more distribution-center workers within the next ten to fifteen years. Due to the importance of this field, even small improvements in efficiency can have major impacts on macroeconomic productivity. For these and/or other reasons, there is a significant and growing need for innovation that supports automating simple tasks that humans currently perform at distribution centers and elsewhere.

BRIEF DESCRIPTION OF THE DRAWINGS

Certain aspects of the present technology can be better understood with reference to the following drawings. The relative dimensions in the drawings may be to scale with respect to some embodiments of the present technology. With respect to other embodiments, the drawings may not be to scale. The drawings may also be enlarged arbitrarily. For clarity, reference-number labels for analogous components or features may be omitted when the appropriate reference-number labels for such analogous components or features are clear in the context of the specification and all of the drawings considered together. Furthermore, the same reference numbers may be used to identify analogous components or features in multiple described embodiments.

DETAILED DESCRIPTION

Figure 1:
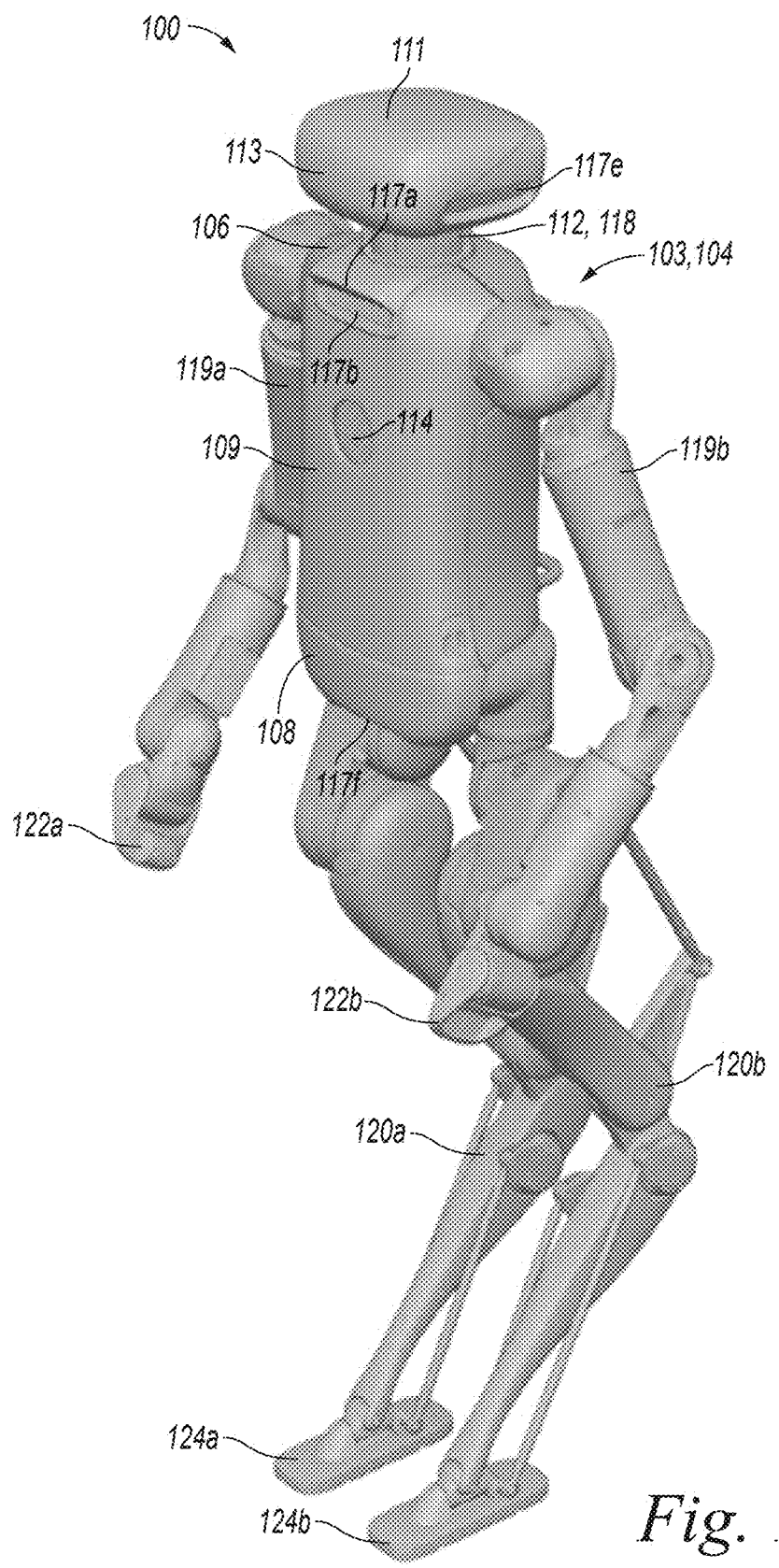
FIGS. 1-3 are, respectively, a first perspective view, a second perspective view, and a front profile view of a robot in accordance with at least some embodiments of the present technology.

Humans receive information about the environment via senses, analyze the information, and use the results to control behaviors. This process of sensing and control is also applicable in robotics. Modern robots may be expected to work in dynamic environments and to perform dynamic tasks, both of which call for at least some level of sensing and control. In particular, many robots require a capacity for object estimation. This includes, among other things, generating object references that a robot uses for object manipulation. An object pose is one example of an object reference potentially useful for this purpose. An object pose includes information about how an object is situated in an environment. This can include information about the position and orientation of an object relative to a known reference, another object, the robot itself, the world, etc. A robot can use an object pose to position an end effector to interact with the corresponding object in a desired manner. For example, a robot knowing an object pose may execute joint commands to locate two end effectors at opposite respective sides of the corresponding object and squeeze the object between the end effectors to grasp the object. Once the object is grasped, the robot may lift the object and carry it to another location.

Object estimation is conventionally considered in the context of objects that have not yet been grasped. The conventional assumption is that once an object has been grasped, an accurate pose of the object is of little or no value and/or is nevertheless readily determinable via a pose of an end effector through which the object is grasped. End effector poses are typically determinable via encoders or other sensors via straightforward processes. This assumption regarding grasped objects, however, is problematic in practice. One reason is that objects frequently shift unpredictably during and immediately after grasping. Accordingly, a spatial relationship between an end effector and an object may be different immediately after a robot grasps the object via the end effector than it was before the robot grasped the object via the end effector. This shifting can occur due to poor contact between the end effector and the object, a timing irregularity, or interaction between the object and an obstruction, among other potential causes. In addition or alternatively shifting between an end effector an object may occur after a robot grasps the object via the end effector. Such shifting can occur due to a collision between the object and another object in the environment, strong acceleration (e.g., when the robot stops abruptly), or shifting of contents of the object (e.g., of heavy items within a tote), among other potential causes.

Once an object has shifted relative to an end effector through which a robot grasps the object, extrapolation of a pre-grasp object estimate is likely to be inaccurate. This inaccuracy can be consequential. Indeed, in some cases, the accuracy of an object pose may be more consequential after the object is grasped than before the object is grasped. For example, some robotic applications call for careful positioning of an object. In a particular example, an application may call for inserting a tote horizontally into a relatively small compartment of a storage rack. If a robot executing this task relies on an inaccurate pose for the tote, the tote is likely to collide with a wall of the compartment. This will almost certainly cause the inserting action to fail. Failures like this, even if they occur only rarely, can cause a robotic system to compare unfavorably to a system that relies on humans. As another example, an accurate pose for a carried object may enhance safety. When a robot knows where a carried object is relative to other objects, potentially dangerous collisions can be more reliably avoided than would otherwise be the case. For these and/or other reasons, determining references for robot-carried objects is an important technical objective.

Unfortunately, generating a pose or another type of reference for a carried object is challenging. Among other issues, a vision sensor of a robot may be poorly suited to gathering information about an object in close proximity, as is typically the case for a carried object. As another issue, a carried object is likely to be in motion at any given time or at least untethered from the poses of other objects in an environment. As yet another issue, generating object poses from perception data even in ideal circumstances tends to be computationally intensive and prone to error. Given these and other technical challenges together with the usefulness of generating references for carried objects, there is a strong need for innovations in this field, such as the innovations discussed herein.

Devices, systems, and methods in accordance with at least some embodiments of the present technology include one or more innovative features related to generating object references and/or using object references to improve the operation of robots. In at least some cases, embodiments of the present technology improve object estimation for carried objects. A method in accordance with a particular embodiment includes using information about an expected object pose to facilitate generating an object reference. This information about the expected object pose can be related to a known pose of an end effector, an expected type of displacement between an object and an end effector, and/or another factor. In addition or alternatively, the method can include repositioning an object to facilitate gathering perception data relevant to determining an object reference for the object. Also in addition or alternatively, the method can include processing estimates from a neural network, such as estimates related to keypoints, contours, and labels of an object. Furthermore, the method can include using these estimates in conjunction with three-dimensional information about an object to register a known model of the object with perception data corresponding to the object's real-time pose.

The foregoing and other features of devices, systems, and methods in accordance with various embodiments of the present technology are further described below with reference to FIGS. 1-29. Although methods, devices, and systems may be described herein primarily or entirely in the context of bipedal robots that manipulate totes, other contexts are within the scope of the present technology. For example, suitable features of described methods, devices, and systems can be implemented in the context of object estimation for controlling other types of mobile robots (e.g., wheeled robots, tracked robots, etc.) or even in the context of object estimation for purposes other than controlling robots. Furthermore, suitable features of described methods, devices, and systems can be implemented in the context of generating estimates for carried objects other than totes, such as boxes, crates, non-packaged hard goods, irregularly shaped objects, etc. Finally, it should be understood, in general, that other methods, devices, and systems in addition to those disclosed herein are within the scope of the present technology. For example, methods, devices, and systems in accordance with embodiments of the present technology can have different and/or additional configurations, components, procedures, etc. than those disclosed herein. Moreover, methods, devices, and systems in accordance with embodiments of the present technology can be without one or more of the configurations, components, procedures, etc. disclosed herein without deviating from the present technology.

Examples of Robot Systems

Figure 2:
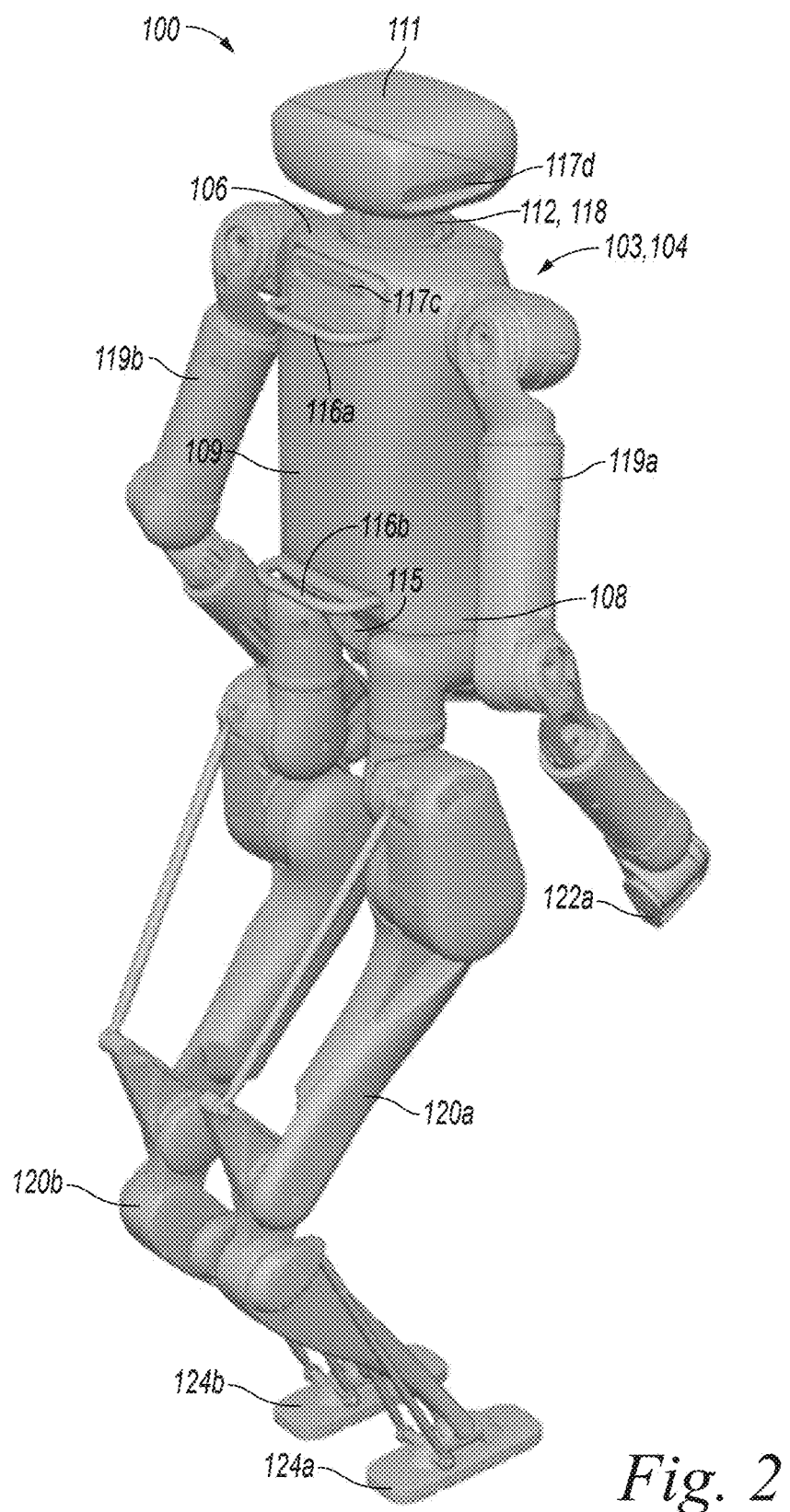
Figure 3:
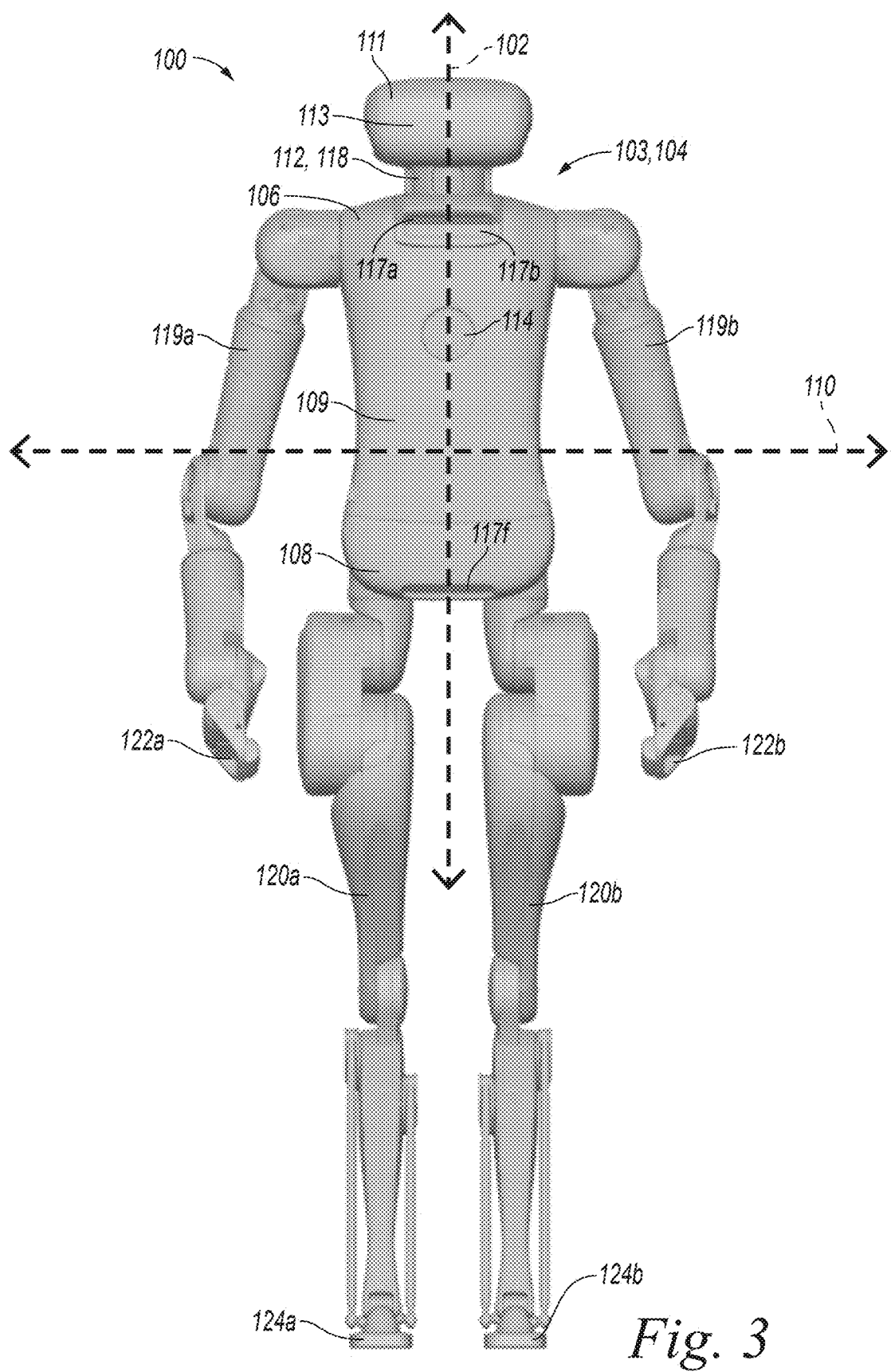

FIGS. 1 and 2 are different perspective views of a robot 100 in accordance with at least some embodiments of the present technology. FIG. 3 is a front profile view of the robot 100. As shown in FIGS. 1-3, the robot 100 can include structures resembling human anatomy with respect to the features, positions, and/or other characteristics of such structures. In at least some cases, the robot 100 defines a midsagittal plane 102 about which the robot 100 is bilaterally symmetrical. In these and other cases, the robot 100 can be configured for bipedal locomotion similar to that of a human. Counterparts of the robot 100 can have other suitable forms and features. For example, a counterpart of the robot 100 can have a non-humanoid form, such as a canine form, an insectoid form, an arachnoid form, or a form with no animal analog. Furthermore a counterpart of the robot 100 can be asymmetrical or have symmetry other than bilateral. Still further, a counterpart of the robot 100 can be configured for non-bipedal locomotion. For example, a counterpart of the robot 100 can be configured for another type of legged locomotion (e.g., quadrupedal locomotion, octopedal locomotion, etc.) and/or non-legged locomotion (e.g., wheeled locomotion, continuous-track locomotion, etc.).

With reference again to FIGS. 1-3, the robot 100 can include a centrally disposed body 103 through which other structures of the robot 100 are interconnected. As all or a portion of the body 103, the robot 100 can include a torso 104 having a superior portion 106, an inferior portion 108, and an intermediate portion 109 therebetween. The robot 100 can define a transverse plane 110 from which the superior and inferior portions 106, 108 of the torso 104 are respectively superiorly and inferiorly spaced apart. The robot 100 can further include a head 111 superiorly spaced apart from the torso 104. The robot 100 can also include a neck 112 through which the head 111 is connected to the torso 104 via the superior portion 106 of the torso 104. The head 111 can have an anteriorly directed display 113. The robot 100 can further include an anteriorly directed audio transmissive window 114 at the intermediate portion 109 of the torso 104, a posteriorly directed exhaust vent 115 at the inferior portion 108 of the torso 104, and handles 116a, 116b extending, respectively, posteriorly from the superior portion 106 of the torso 104 and posteriorly from the inferior portion 108 of the torso 104.

The robot 100 can still further include elongate sensor bays 117 (individually identified as elongate sensor bays 117a-117f) carried by the torso 104 and the head 111. The sensor bay 117a can be at the anterior side of the superior portion 106 of the torso 104 and tilted inferiorly. The sensor bay 117b can be inferiorly adjacent to the sensor bay 117a at the anterior side of the superior portion 106 of the torso 104 and less tilted than the sensor bay 117a. The sensor bay 117c can be at the posterior side of the superior portion 106 of the torso 104 and posteriorly directed. The sensor bays 117d, 117e can be at opposite respective sides of the head 111 and can be directed in opposite respective lateral directions. The sensor bay 117f can be at the inferior portion 108 of the torso 104 and directed anteriorly and inferiorly toward a ground level in front of the robot 100. The robot 100 can further include a cylindrical sensor bay 118 at the neck 112. At the elongate sensor bays 117a-117f and the cylindrical sensor bay 118, the robot 100 can include perception sensors through which the robot 100 can receive information about an environment in which it operates. The perception sensors can emit and/or receive optical, audio, electromagnetic, and/or other types of signals. Examples of suitable perception sensors include cameras (e.g., red-green-blue (RGB) cameras, infrared cameras, stereoscopic cameras, etc.), light detection and ranging (LIDAR) sensors, and sound navigation and ranging (SONAR) sensors. In a particular example, the robot 100 includes cameras at the elongate sensor bays 117a-117f and a LIDAR sensor at the cylindrical sensor bay 118.

The robot 100 can further include articulated appendages carried by the torso 104. Among these articulated appendages, the robot 100 can include arms 119a, 119b and legs 120a, 120b. At the individual articulations of the arms 119a, 119b and legs 120a, 120b, the robot 100 can include a joint and a corresponding actuator, such as a rotary actuator with a motor and gearing (e.g., cycloidal or strain-wave gearing). For clarity of illustration the joints and actuators are not labeled with reference numbers in FIGS. 1-3. In at least some cases, the robot 100 is configured to manipulate objects via the arms 119a, 119b, such as bimanually. In these and other cases, the robot 100 can be configured to ambulate via the legs 120a, 120b, such as bipedally. The arms 119a, 119b and the legs 120a, 120b can define kinematic chains. In at least some cases, the kinematic chains corresponding to the arms 119a. 119b provide at least five degrees of freedom, such as exactly five or exactly six degrees of freedom. In these and other cases, the kinematic chains corresponding to the legs 120a. 120b can provide at least four degrees of freedom, such as exactly four, exactly five, or exactly six degrees of freedom. As parts of the arms 119a, 119b, the robot 100 can include end effectors 122a, 122b at distalmost portions of the corresponding kinematic chains. Similarly, as parts of the legs 120a, 120b, the robot 100 can include feet 124a, 124b at distalmost portions of the corresponding kinematic chains. In the illustrated embodiment, the end effectors 122a, 122b and the feet 124a, 124b are not articulated. In other embodiments, counterparts of some or all of the end effectors 122a, 122b and the feet 124a, 124b can be articulated, such as with one or more movable fingers or toes.

Examples of Electrical, Computer, and Software Systems

Figure 4:
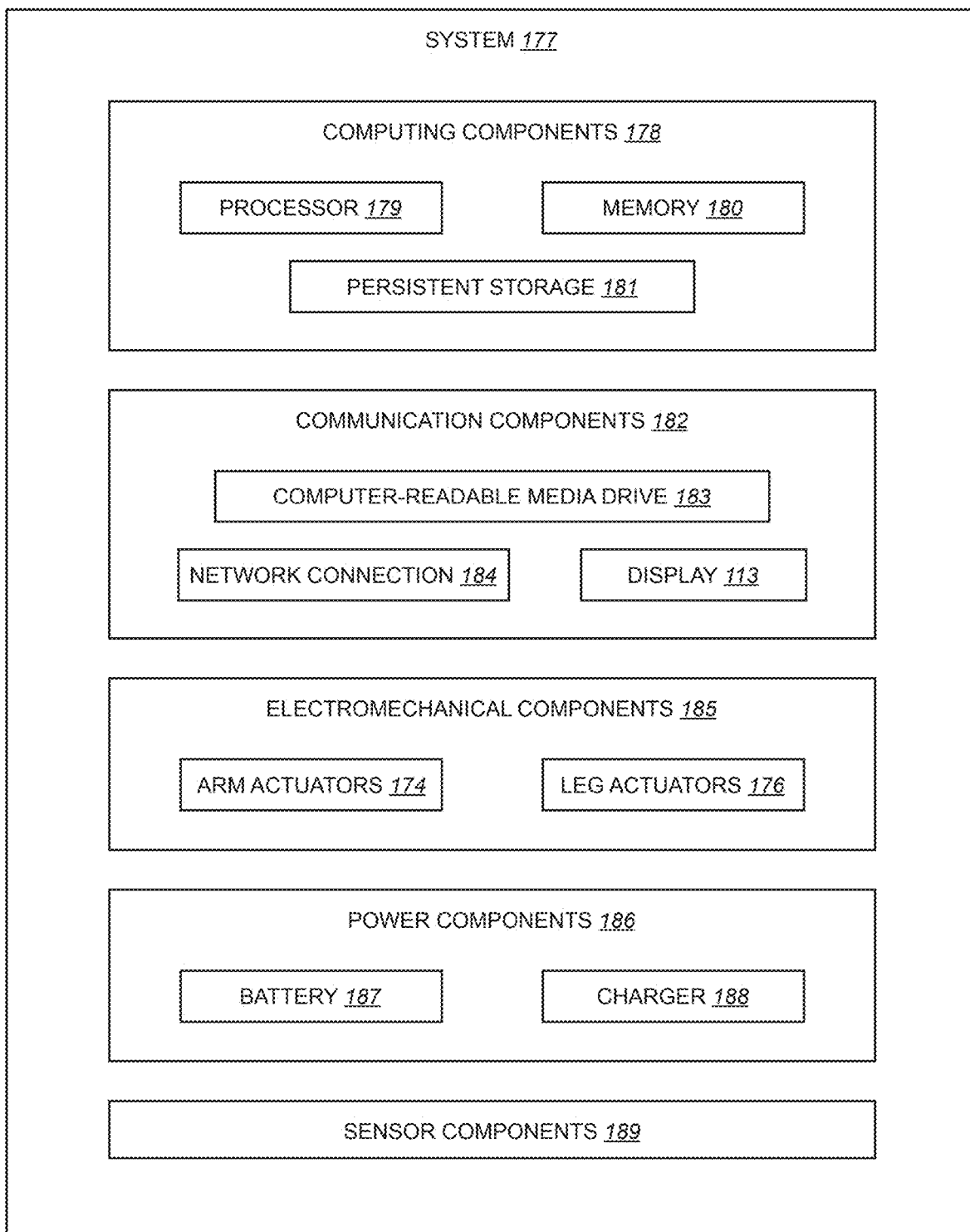
FIG. 4 is a block diagram corresponding to a system including electrical, computer, and software components of the robot of FIGS. 1-3.

When suitable, operations described elsewhere in this disclosure (e.g., data operations, movements of the robot 100, other operations of the robot 100, etc.) can be implemented at least partially via the electrical, computer, and software devices and systems disclosed in this section. FIG. 4 is a block diagram corresponding to a system 177 including electrical, computer, and software components of the robot 100. As shown in FIG. 4, the system 177 can include computing components 178. The computing components 178 can include a processor 179, such as one or more general-purpose and/or special-purpose integrated circuits including digital logic gates for executing programs and/or for otherwise processing data. The computing components 178 can further include memory 180, such as one or more integrated circuits for storing data in use. The memory 180 can include a multithreaded program, an operating system including a kernel, device drivers, etc. The computing components 178 can further include persistent storage 181, such as a hard drive for persistently storing data. Examples of data that can be stored by the persistent storage 181 include diagnostic data, sensor data, configuration data, environmental data, and current-state data. The computing components 178 can collectively define a computer configured to manage, control, receive information from, deliver information to, and/or otherwise usefully interact with other components of the system 177.

The system 177 can further include communication components 182. The communication components 182 can include a computer-readable media drive 183 for reading computer programs and/or other data stored on computer-readable media. As one example, the computer-readable media drive 183 can be a flash-memory drive. The communication components 182 can further include a network connection 184 for connecting the robot 100 to other devices and systems, such as other robots and/or other computer systems. The network connection 184 can be wired and/or wireless and can be via the Internet, a Local Area Network (LAN), a Wide Area Network (WAN), BLUETOOTH®, Wi-Fi®, a cell phone network, etc. The network connection 184 can include networking hardware, such as routers, switches, transmitters, receivers, computer-readable transmission media, etc. The communication components 182 can further include the display 113 discussed above and/or other suitable components for communicating with a user. The robot 100 can use the communication components 182 for internal operations and/or to interact with devices and/or systems external to the robot 100, such as systems for providing contextual information about the environment in which the robot 100 operates and/or systems for changing operating conditions of the robot 100.

The system 177 can further include electromechanical components 185. The electromechanical components 185 can include the actuators discussed above and/or other suitable components for implementing mechanical action within the robot 100. The system 177 can further include power components 186. The power components 186 can include a battery 187 and a charger 188. The battery 187 can be a lithium-ion battery, a lead-acid battery, or a battery of another suitable type. The charger 188 can include a connector (not shown) compatible with a power source (e.g., a wall outlet) and leads (also not shown) extending between the connector and the battery 187. In at least some cases, the robot 100 is configured to operate wirelessly via the battery 187 and to recharge via the charger 188.

Finally, the system 177 can include sensor components 189 for capturing, providing, and/or analyzing information about the robot 100 itself and/or the environment in which the robot 100 is operating. The sensor components 189 can include the examples discussed above of sensors at the elongate sensor bays 117 and at the cylindrical sensor bay 118. At these and/or at one or more other suitable locations, the robot 100 can include among the sensor components 189, a light sensor (e.g., a photoresistor), a sound sensor (e.g., a microphone), a location sensor (e.g., using the Global Positioning System), a two-dimensional sensor, a three-dimensional sensor, and/or a proximity sensor, among other examples. Within the body 103 and/or at one or more other suitable locations, the robot 100 can include among the sensor components 189, an accelerometer, a gyroscope, a magnetometer, and/or a tilt sensor, among other examples. At the end effectors 156a, 156b and/or at one or more other suitable locations, the robot 100 can include among the sensor components 189, a contact sensor and/or a force sensor, among other examples. In at least some cases, two or more different types of sensors are incorporated into a sensor assembly. For example, an accelerometer, a gyroscope, and a magnetometer can be incorporated into an inertial measurement unit (IMU) through which the robot 100 can determine acceleration, angular velocity, and orientation. The robot 100 can include an IMU within the torso 104, within the head 111, and/or at one or more other suitable locations.

At one, some, or all of the actuators and/or at one or more other suitable locations, the robot 100 can include among the sensor components 189, sensors that measure properties of the corresponding joints. Such properties can include position, orientation (e.g., yaw, pitch, and roll), applied force (e.g., torque), elevation, mass, velocity, and acceleration, among other examples. The measurements of these properties can be direct or indirect. As an example of direct sensing, the robot 100 may sense a torque acting on a given joint via a torque sensor operably associated with the joint. As another example of direct sensing, the robot 100 may sense a position of a given joint via an encoder operably associated with the joint. Any joint described herein should be construed as potentially including a torque sensor, encoder, or other suitable mechanism for direct sensing. As an example of indirect sensing, the robot 100 may sense a position of a given one of the end effectors 122a, 122b or other component based on perception data corresponding to the component and other perception data corresponding to a reference. The robot 100 can include one or more sensors in a sensor system, such as a vision system, a LIDAR system, a stereoscopic camera system, a SONAR system, etc. In at least some cases, the robot 100 monitors itself and/or its environment in real-time or in near real-time. Moreover, the robot 100 may use acquired sensor data as a basis for decision-making via the computing components 178.

Components of the system 177 can be connected to one another and/or to other components of the robot 100 via suitable conductors, transmitters, receivers, circuitry, etc. While the system 177 configured as described above may be used to support operation of the robot 100, it should be appreciated that the robot 100 may be operated using devices of various types and configurations and that such devices may have various components and levels of responsibility. For example, the robot 100 may employ individual computer systems or controllers to manage discrete aspects of its operations, such as an individual computer system or controller to perform computer vision operations, a separate computer system or controller to perform power management, etc. In some cases, the robot 100 employs the system 177 to control physical aspects of the robot 100 according to one or more designated rules encoded in software. For example, these rules can include minimums and/or maximums, such as a maximum degree of rotation for a joint, a maximum speed at which a component is allowed to move, a maximum acceleration rate for one or more components, etc. The robot 100 may include any number of mechanical aspects and associated rules, which may be based on or otherwise configured in accordance with the purpose of and/or functions performed by the robot 100.

Software features of the robot 100 may take the form of computer-executable instructions, such as program modules executable by the computing components 178. Generally, program modules include routines, programs, objects, components, data structures, and/or the like configured to perform particular tasks based on source data, which may be encrypted. Control scripts may be implemented via a suitable language, such as in C/C++ or Python®. The functionality of the program modules may be combined or distributed in various embodiments, including in cloud-based implementations, web applications, mobile applications for mobile devices, etc. Furthermore, certain aspects of the present technology can be embodied in special purpose computers or data processors, such as in application-specific integrated circuits (ASIC), digital signal processors (DSP), field-programmable gate arrays (FPGA), graphics processing units (GPU), many core processors, etc. specifically programmed, configured, or constructed to perform one or more computer-executable instructions. While aspects of the present technology, such as certain functions, may be described as being performed on a single device, these aspects, when suitable, can also be practiced in distributed computing environments where functions or modules are shared among different processing devices linked through a communications network such as a LAN, WAN, or the Internet. In a distributed computing environment, program modules and other components may be located in both local and remote memory storage and other devices, which may be in communication via one or more wired and/or wireless communication channels.

Aspects of the present technology may be stored or distributed on tangible computer-readable media, which can include volatile and/or non-volatile storage components, such as magnetically or optically readable computer media, hard-wired or preprogrammed chips (e.g., EEPROM semiconductor chips), nanotechnology memory, or other computer-readable storage media. Alternatively, computer-implemented instructions, data structures, screen displays, and other data under aspects of the present technology may be distributed (encrypted or otherwise) over the Internet or over other networks (including wireless networks), on a propagated signal on a propagation medium (e.g., electromagnetic wave(s), sound wave(s), etc.) over a period of time, or they may be provided on any analog or digital network (packet switched, circuit switched, or other scheme). Furthermore, the term computer-readable storage medium does not encompass signals (e.g., propagating signals) or transitory media. One of ordinary skill in the art will recognize that various components of the robot 100 may communicate via any number of wired and/or wireless communication techniques and that elements of the robot 100 may be distributed rather than located in a single monolithic entity. Finally, electrical and computing aspects of robots in accordance with various embodiments of the present technology may operate in environments and/or according to processes other than the examples of environments and processes described herein.

Figure 5:
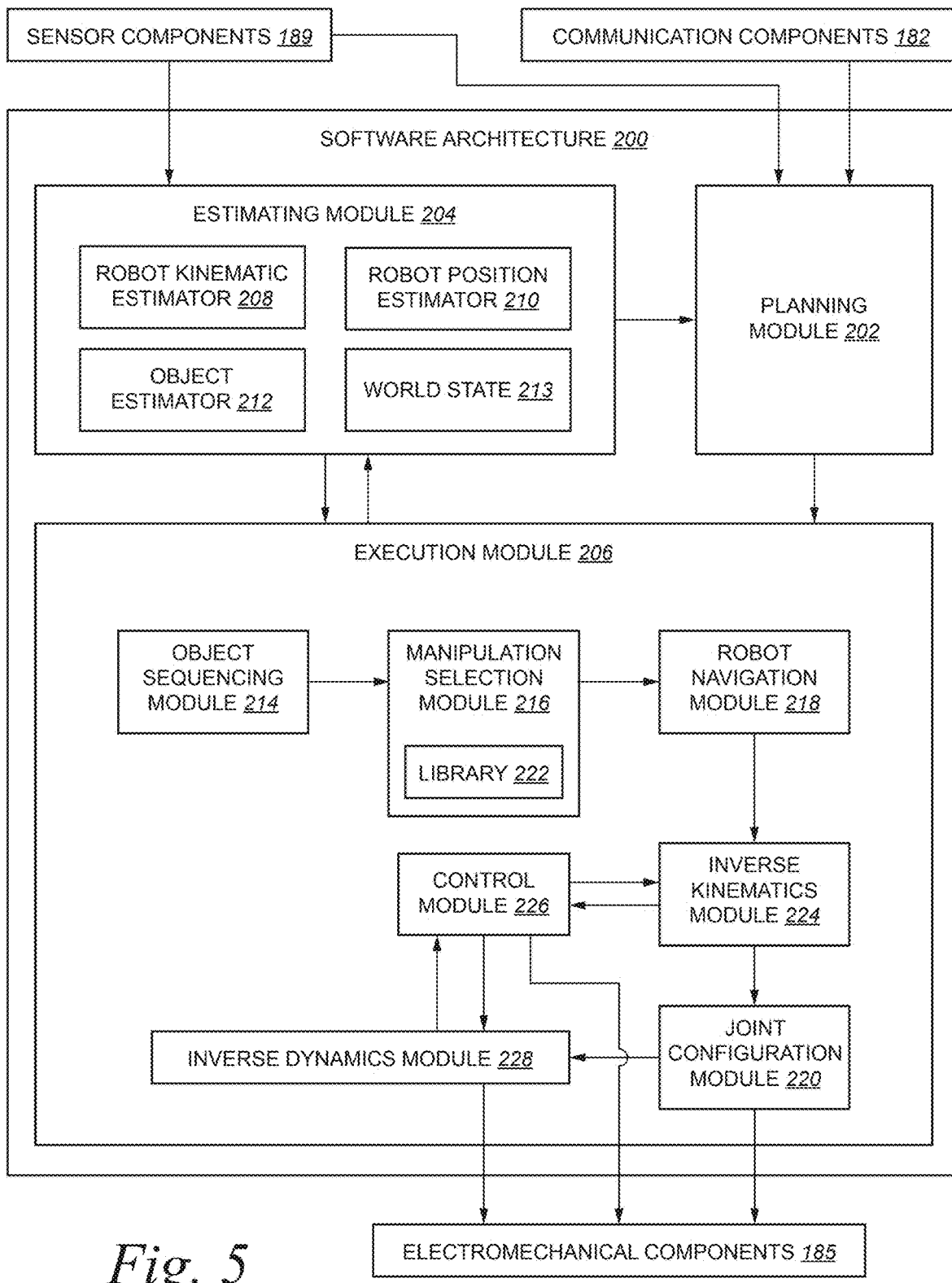
FIG. 5 is a block diagram corresponding to software architecture and associated portions of the system of FIG. 4.

FIG. 5 is a block diagram corresponding to a software architecture 200 and associated portions of the system 177. The software architecture 200 can be within the software features of the system 177. With reference to FIGS. 4 and 5 together, the software architecture 200 can include a planning module 202, an estimating module 204, and an execution module 206 operably associated with one other. The planning module 202 can be configured to relay or to generate a plan corresponding to an objective for the robot 100 (e.g., unload all objects on a shelf, retrieve an object from a first location and move the object to a second location, etc.). In at least some cases, the planning module 202 receives information from the communication components 182 and relays or generates a plan based at least partially on the received information. For example, the planning module 202 may receive a command from a user via the communication components 182 and relay the command as a plan. As another example, the planning module 202 may receive a command from a user via the communication components 182 and generate a plan related to the command. As yet another example, the planning module 202 may generate a plan without receiving a command from a user, such as at a predetermined time or in response to information about a current state of the robot 100 or the environment received via the sensor components 189.

The estimating module 204 can receive information from the sensor components 189 and can generate estimates in real time or in near real time to inform generating and/or executing a plan. The estimating module 204 can include a robot kinematic estimator 208, a robot position estimator 210, an object estimator 212, and a world state 213. The robot kinematic estimator 208 can generate an estimate of a current kinematic state of the robot 100 (e.g., balanced, off-balance, walking, standing, etc.) and estimates of positions of individual joints of the robot 100. The robot position estimator 210 can generate a current estimate of a position of the robot 100 within an environment. This position can be a set of coordinates and can be based on perception information, GPS information, and/or other information received or generated by the robot 100. Perception information potentially relevant to the position of the robot 100 includes, among other examples, information corresponding to distances between the robot 100 and landmarks in an environment and information corresponding to fiducial markings (e.g., AprilTags) carried by or otherwise associated with the landmarks. This information can be detected, for example, via a three-dimensional sensor of the robot 100 and/or via a camera of the robot 100. Furthermore, information can move between components of the estimating module. For example, the world state 213 can receive information from the robot kinematic estimator 208, the robot position estimator 210, and the object estimator 212. In addition or alternatively, the object estimator 212 can receive information from the robot kinematic estimator 208 and the robot position estimator 210 directly.

The object estimator 212 can generate a current estimate of an object (e.g., a tote) within an environment. In at least some cases, the estimate is a pose or other reference corresponding to a position of an object. As with the position of the robot, the position of an object can be a set of coordinates and can be based on perception information, GPS information, and/or other information received or generated by the robot 100. Perception information potentially relevant to the position of an object includes, among other examples, information corresponding to distances between the object and the robot 100, distances between the object and landmarks in an environment, and information corresponding to fiducial markings (e.g., AprilTags) carried by or otherwise associated with the object. This information can be detected, for example, via a three-dimensional sensor of the robot 100 and/or via a camera of the robot 100. In at least some cases, the object estimator 212 uses information (e.g., sensor poses) from the robot kinematic estimator 208 and/or the robot position estimator 210 to inform generation of object estimates. This can be useful, for example, when a fiducial or other landmark in an environment is not visible. Details of the object estimator 212 are further described below with reference to FIG. 6. In at least some cases, the object estimator 212 is configured to update the world state 213 with object references, support structure references, and/or other information related to objects in an environment in which the robot 100 operates.

The execution module 206 can be configured to receive a plan from the planning module 202 and estimates from the estimating module 204. The execution module 206 can include an object sequencing module 214, a manipulation selection module 216, a robot navigation module 218, and a joint configuration module 220. The planning module 202 can be configured to send a plan to the object sequencing module 214, to the manipulation selection module 216, to the robot navigation module 218, or to the joint configuration module 220 based on attributes of the plan. For example, when a plan includes explicit instructions for positions of the electromechanical components 185, the planning module 202 can send the plan to the execution module 206 via the joint configuration module 220. As another example, when a plan does not involve manipulating an object, the planning module 202 can send the plan to the execution module 206 via the robot navigation module 218. As yet another example, when a plan concerns only one object and the object is remote to the robot 100, the planning module 202 can send the plan to the execution module 206 via the manipulation selection module 216. As a final example, when a plan concerns multiple objects remote to the robot 100, the planning module 202 can send the plan to the execution module 206 via the object sequencing module 214.

The object sequencing module 214 can receive one or more estimates from the estimating module 204 and can generate a sequence in which multiple objects are to be manipulated. For example, when the object sequencing module 214 receives a plan to unload a shelf, the object sequencing module 214 can query the estimating module 204 for current locations of objects on the shelf. The object sequencing module 214 can then assign the objects an order, convert the order into a queue, and pass the queue to the manipulation selection module 216. The manipulation selection module 216 can include a library 222 including two or more different motion sequences that can be used to manipulate an object. The manipulation selection module 216 can select a motion sequence for a given object based on information, such as information about the object and/or information about the environment. The robot navigation module 218 can generate targets for different parts of the robot 100 further to a plan or to a portion of a plan being executed. Examples of targets include positions of the feet 124a, 124b in the environment, positions of the end effectors 122a, 122b in the environment, etc. The robot navigation module 218 can update these targets continuously or near continuously based on information from the estimating module 204. The execution module 206 can further include an inverse kinematics module 224 that translates the targets from the robot navigation module 218 into joint configurations throughout the robot 100.

The execution module 206 can also include a control module 226 that receives joint configurations from the inverse kinematics module 224 and generates joint parameters (e.g., positions, velocities, accelerations, etc.) to be executed by the robot 100 to achieve these joint configurations. Through continuous or near-continuous communication with the inverse kinematics module 224, the control module 226 can modify the joint parameters to at least partially compensate for deviations as the robot 100 executes the joint configurations. The inverse kinematics module 224 can send other joint configurations not subject to active control to the joint configuration module 220. Similar to the control module 226, the joint configuration module 220 can generate joint parameters (e.g., positions, velocities, accelerations, etc.) to be executed by the robot 100 to achieve joint configurations received from the inverse kinematics module 224 or from the planning module 202.

Finally, the execution module 206 can include an inverse dynamics module 228 that receives joint parameters from the control module 226 and from the joint configuration module 220. The inverse dynamics module 228 can track a desired wrench of the robot 100 and its relationship with objects in the environment. In at least some cases, the inverse dynamics module 228 references a map of robot positions and wrenches to joint torques. Based at least partially on the tracking, the inverse dynamics module 228 can modify the joint parameters to achieve a desired result. For example, the inverse dynamics module 228 can modify the joint parameters to maintain contact between the end effectors 122a, 122b and an object as the robot 100 carries the object. The inverse dynamics module 228 can then send modified joint parameters to the electromechanical components 185 for execution. For configurations that do not involve a dynamic interaction with the environment, the control module 226 and the joint configuration module 220 can send joint parameters directly to the electromechanical components 185 for execution.

Figure 6:
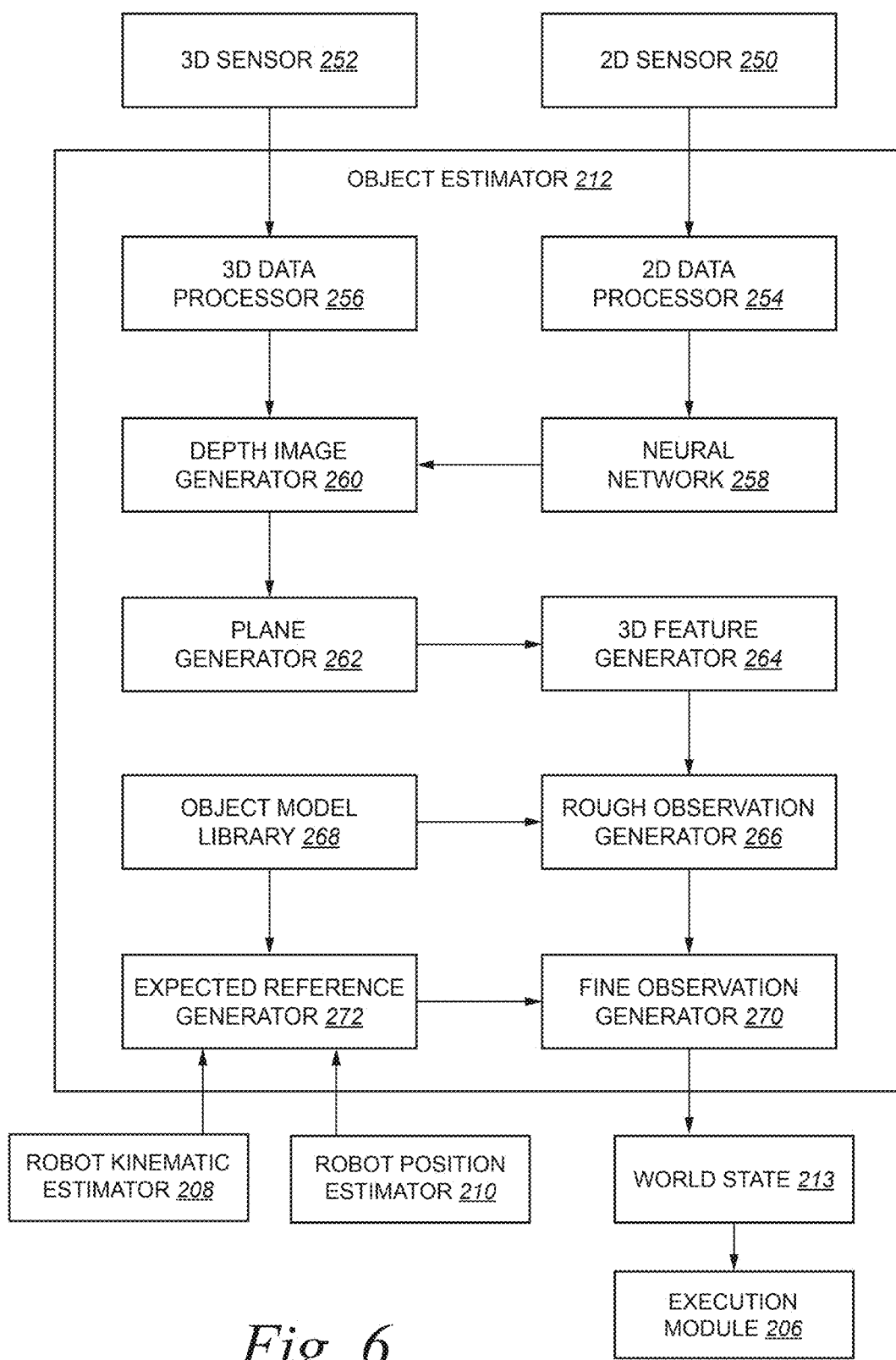
FIG. 6 is a block diagram corresponding to an object estimator of the software architecture of FIG. 5 and associated portions of the system of FIG. 4.

FIG. 6 is a block diagram corresponding to the object estimator 212 and associated portions of the system 177. As shown in FIG. 6, the system 177 can include a two-dimensional sensor 250 and a three-dimensional sensor 252 among the sensor components 189. The object estimator 212 can receive two-dimensional data (e.g., image data) and three-dimensional data (e.g., depth data) from the two-dimensional sensor 250 and the three-dimensional sensor 252, respectively. In at least some cases, the object estimator 212 includes a two-dimensional data processor 254 and a three-dimensional data processor 256 configured to process data from the two-dimensional sensor 250 and the three-dimensional sensor 252, respectively. The two-dimensional data processor 254 can downsize the two-dimensional data to a resolution closer to a resolution of the three-dimensional data. In addition or alternatively, the two-dimensional data processor 254 can register the two-dimensional data to a reference frame of the two-dimensional sensor 250. Similarly, the three-dimensional data processor 256 can register the three-dimensional data to a reference frame of the three-dimensional sensor 252.

The object estimator 212 can further include a neural network 258 that receives processed data from the two-dimensional data processor 254. In a particular example, the neural network 258 is at least partially based on Detectron2 (Facebook AI Research) with a Mask R-CNN implementation. The neural network 258 can be configured to recognize objects of interest in the two-dimensional data and to provide estimates of features of these objects. For example, the neural network 258 can be trained to recognize a tote and to provide keypoints corresponding to features (e.g., corners) of the tote. In addition or alternatively the neural network 258 can be trained to provide non-keypoint references of an object, such as a contour corresponding to an outline of a tote. Training the neural network 258 can include providing the neural network 258 with training images depicting totes or other objects carried by the robot 100, such as images from the two-dimensional sensor 250 and/or similar images from other robots. The training images can be human or machine annotated to include useful information that the neural network 258, once trained, will provide for new images. In the illustrated example, input and output to and from the neural network 258 is two-dimensional. In another example, a counterpart of the neural network 258 can be trained on, receive, and/or output three-dimensional information. Furthermore, the neural network 258 can be trained to distinguish between carried objects and non-carried objects, such as by including a corresponding label in the training images. In addition or alternatively, the object estimator 212 can be configured to use one or more heuristics to make this distinction.

With reference again to FIG. 6, the object estimator 212 can further include a depth image generator 260 that receives three-dimensional data from the three-dimensional data processor 256 directly and receives two-dimensional data from the two-dimensional data processor 254 via the neural network 258 along with two-dimensional information (e.g., two-dimensional keypoints, contours, etc.) and/or other information (e.g., labels) that the neural network 258 generates from the two-dimensional data. The depth image generator 260 can use a known relationship between respective reference frames of the two-dimensional sensor 250 and the three-dimensional sensor 252 to combine the two-dimensional data and the three-dimensional data into a depth image. The resulting depth image can include three-dimensional information (e.g., coordinates) for all or only some (e.g., representative) pixels of two-dimensional information corresponding to the two-dimensional data. The information from the neural network 258 can be incorporated into the depth image in conjunction with the two-dimensional information from the two-dimensional data processor 254. The interaction between the two-dimensional data processor 254, the three-dimensional data processor 256, the neural network 258, and the depth image generator 260 illustrated in FIG. 6 is just one example. In other examples, these components can interact with one another in another suitable manner. For example, the depth image generator 260 can receive processed two-dimensional data from the two-dimensional data processor 254 directly and register the processed two-dimensional data with two-dimensional information from the neural network 258.

With reference again to FIG. 6, the object estimator 212 can further include a plane generator 262 that receives input from the depth image generator 260. The plane generator 262 can be configured to identify one or more approximately planar features in a depth image from the depth image generator 260 and to output planes corresponding to the one or more approximately planar features. For example, the plane generator 262 can separate a portion of a depth image within a contour indicating an object boundary, identify one or more approximately planar features in the separated portion of the depth image, and output one or more planes corresponding to the one or more approximately planar features. The approximately planar features can be walls of a tote. In at least some cases, the plane generator 262 is configured to identify approximately planar features based at least partially on surface normals. For example, the plane generator 262 can be configured to generate surface normals for segments (e.g., voxels) in a depth map based on three-dimensional information for neighboring segments. These surface normals can then be clustered, such as via euclidean clustering. When a cluster of surface normals generated in this or another suitable manner are sufficiently similar, the corresponding segments can be classified as an approximately planar feature. An algorithm for determining the level of similarity can be tuned to allow an object feature to be classified as approximately planar even if some portions of the feature (and the corresponding surface normals) are not planar. The plane generator 262 can determine a plane corresponding to an approximately planar feature via a plane fitting algorithm, such as an algorithm including a random sample consensus followed by a least squares fit. Resulting planes with similar plane equations (i.e., equations defining similar normals and offsets) can be grouped to avoid duplication. Using these and/or other suitable processing techniques, planes can be generated for major surfaces of an object even if the major surfaces are not uniformly flat, such as because they include ridges, grooves, lips, etc.

The object estimator 212 can further include a three-dimensional feature generator 264 that receives the combined output from the neural network 258, the depth image generator 260, and the plane generator 262. The three-dimensional feature generator 264 can be configured to use three dimensional information from the depth map to convert a two-dimensional reference from the neural network 258 into a three-dimensional reference. For example, the three-dimensional feature generator 264 can be configured to convert a two-dimensional keypoint from the neural network 258 into a three-dimensional keypoint. In at least some cases, the three-dimensional feature generator 264 uses planes from the plane generator 262 to associate two-dimensional keypoints from the neural network 258 with three-dimensional information. In a particular example, the three-dimensional feature generator 264 uses a reference frame for the two-dimensional sensor 250 to determine rays for respective two-dimensional keypoints from the neural network 258. The three-dimensional feature generator 264 can then determine intersections of the rays and the planes from the plane generator 262. These intersections can then be associated with labels from the neural network 258 for the corresponding object features and output as three-dimensional keypoints for these object features. Other approaches to generating three-dimensional keypoints are also possible.

The object estimator 212 can further include a rough observation generator 266 that receives information (e.g., one or more three-dimensional keypoints) from the three-dimensional feature generator 264. The object estimator 212 can also include an object model library 268 that stores structure data (e.g., CAD data) for one or more objects of interest. For example, the object model library 268 can include a CAD model for a tote. The rough observation generator 266 can be configured to select an object model from the object model library 268 and to register the selected object model to a reference frame (e.g., of the robot 100) based on correspondence between the object model and the information from the three-dimensional feature generator 264. In at least some cases, the rough observation generator 266 selects the object model at least partially based on correspondence with an object identification label (e.g., an object type label) from the neural network 258. In these and other cases, the rough observation generator 266 can register the object model at least partially by matching a keypoint and label of the object model with a corresponding three-dimensional keypoint and label from the three-dimensional feature generator 264. Furthermore, this process can be repeated for any additional available keypoints and labels. In this way, the rough observation generator 266 can generate a rough estimate of an object while the robot 100 carries the object.

The object estimator 212 can still further include a fine observation generator 270 configured to refine a rough estimate from the rough observation generator 266. The object estimator 212 can also include an expected reference generator 272 configured to provide the fine observation generator 270 with an expected reference. In at least some cases, the expected reference generator 272 generates an expected reference based at least primarily on non-perception information. The expected reference can be a reference frame that an object the robot 100 carries would have if the object moved predictably relative to (e.g., in unison with) one or both of the end effectors 122a, 122b. Assuming such movement, the expected reference can be derived from a reference for the corresponding one or both of the end effectors 122a, 122b. In these and other cases, the expected reference generator 272 can receive information from the robot kinematic estimator 208 and/or the robot position estimator 210 and use such information to generate the expected reference. The fine observation generator 270 can be configured to use the expected reference from the expected reference generator 272 and the rough estimate from the rough observation generator 266 to generate a new estimate that is closer to an actual state of an object carried by the robot 100 than are the expected reference or the rough estimate. In at least some cases, the fine observation generator 270 processes the expected reference and the rough estimate using a matching algorithm, such as an iterative closest point algorithm. Finally, the object estimator 212 can update the world state 213 with the estimate from the fine observation generator 270, which can then be made available to the execution module 206 for use in controlling the robot 100.

With reference to FIGS. 4-6 together, suitable software components disclosed herein can be part of a distributed system or component thereof and/or implemented as one or more network-based services. For example, a compute cluster within a computing service may present computing and/or storage services and/or other types of services that employ any distributed computing systems described herein to clients as network-based services. In some embodiments, a network-based service may be implemented by a software and/or hardware system designed to support interoperable machine-to-machine interaction over a network. A network-based service may have a gateway described in a machine-processable format. Other systems may interact with the network-based service in a manner prescribed by the description of the network-based service's gateway. For example, the network-based service may define various operations that other systems may invoke, and may define a particular application programming interface (API) to which other systems may be expected to conform when requesting the various operations. An API refers to an interface and/or other communication protocol between a client and a server, such that if the client makes a request in a predefined format, the client should receive a response in a specific format or initiate a defined action. In the cloud provider network context, APIs may provide a gateway for customers to access cloud infrastructure by allowing customers to obtain data from or to cause actions within the cloud provider network, enabling the development of applications that interact with resources and services hosted in the cloud provider network. APIs can also enable different services of the cloud provider network to exchange data with one another.

Examples of Generating References for Robot-Carried Objects and Related Methods

Figure 7:
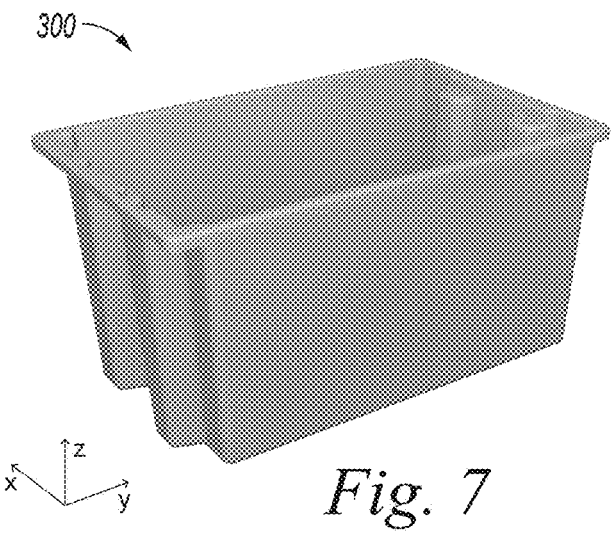
FIGS. 7-9 are, respectively, a perspective view, a front profile view, and a side profile view of an object that the robot of FIGS. 1-3 is capable of manipulating.
Figure 8:
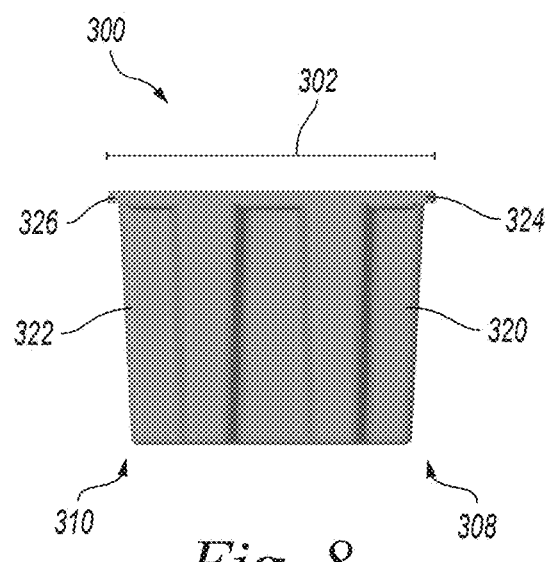
Figure 9:
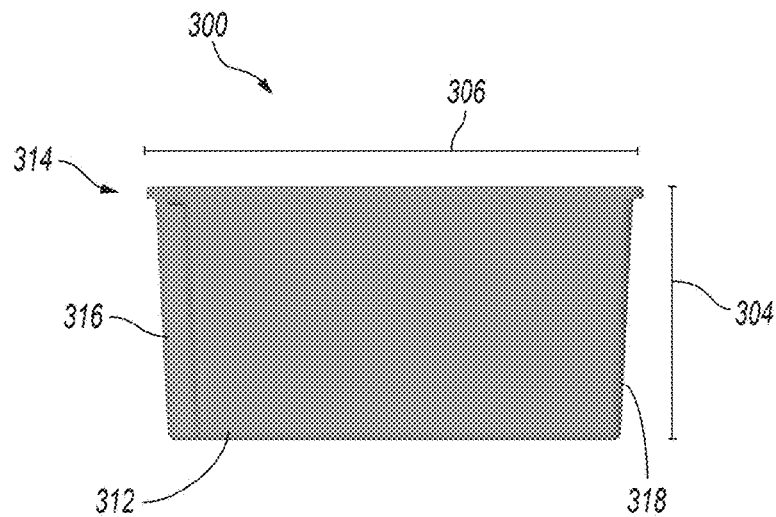

Methods in accordance with at least some embodiments of the present technology may be described in this section and elsewhere in this disclosure in the context of an object 300 as shown in FIGS. 7-9. With reference to FIGS. 7-9, the object 300 can be fungible. This is common, for example, among plastic totes used in modern distribution centers. These totes are often made from molds in large quantities such that very little variation exists from one tote to another. Reference herein to objects 300 contemplates the object 300 and other objects of the same or similar shape. The objects 300 can define shape features relevant to determining object references. For example, the objects 300 can define corners, edges, and surfaces corresponding to respective sets of coordinates in a three-dimensional space.

As shown in FIGS. 8 and 9, the object 300 can define an object width 302, an object height 304, and an object depth 306 perpendicular to one another. The object 300 can include a first side portion 308 and a second side portion 310 spaced apart from one another along the object width 302. The object 300 can further include a bottom portion 312 and a top portion 314 spaced apart from one another along the object height 304. The object 300 can also include a front portion 316 and a rear portion 318 spaced apart from one another along the object depth 306. As parts of the first and second side portions 308, 310, the object 300 can include first and second sidewalls 320, 322, respectively, and first and second protrusions 324, 326, respectively. The first and second protrusions 324, 326 can extend laterally outward from the first and second sidewalls 320, 322, respectively. The first and second sidewalls 320, 322 can taper inwardly from the top portion 314 of the object 300 toward the bottom portion 312 of the object 300. Correspondingly, the object width 302 can decrease from the top portion 314 of the object 300 toward the bottom portion 312 of the object 300 along the object height 304.

In the illustrated case, the object 300 is an open tote. The top portion 314 of the object 300 can be a lidless rim defining an opening through which the object 300 can be loaded and unloaded. Due to this aspect of the object 300, excessive tilting of the object 300 during manipulation may cause contents to fall out of the object 300. For this and/or one or more other reasons, it can be useful to maintain the object 300 in an upright state during manipulation. In other cases, a counterpart of the object 300 can have another suitable form. For example, a counterpart of the object 300 can be a box, an unpackaged hardgood, or a tote having a different form. In a counterpart tote, the first and second sidewalls 320, 322 can be vertical rather than tapered. In addition or alternatively, counterparts of the first and second protrusions 324, 326 can extend from the first and second sidewalls 320, 322 of the object 300 below rather than at the top portion 314 of the object 300.

Figure 10:
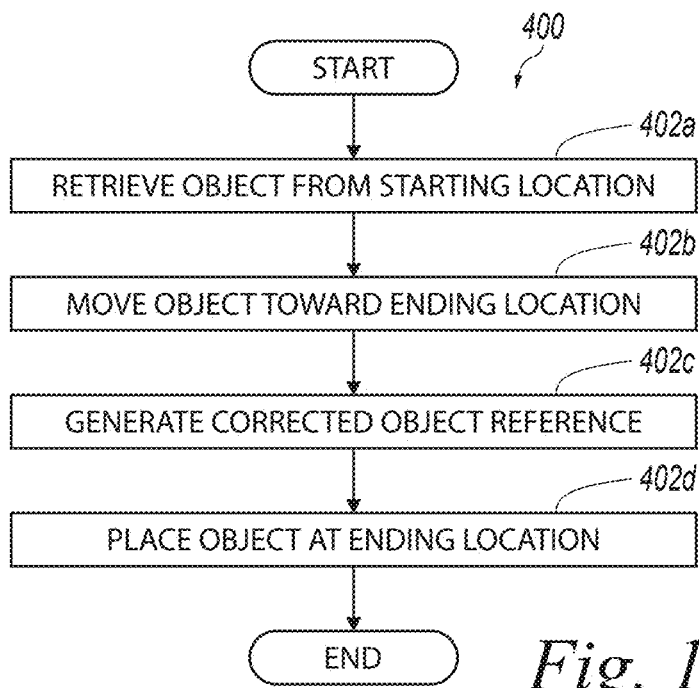
FIGS. 10-12 are block diagrams corresponding to respective methods for relocating objects in accordance with at least some embodiments of the present technology.
Figure 11:
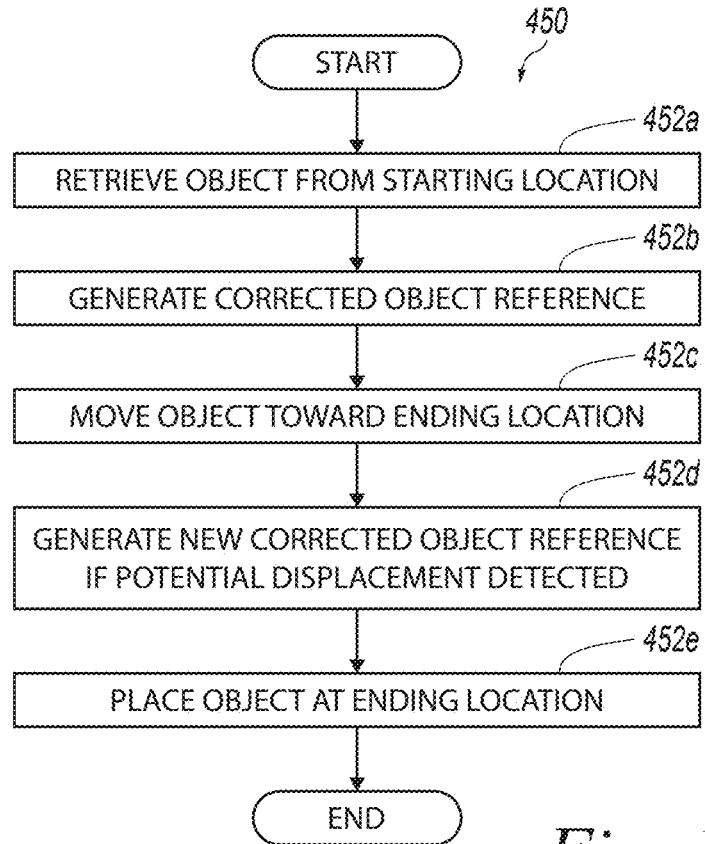
Figure 12:
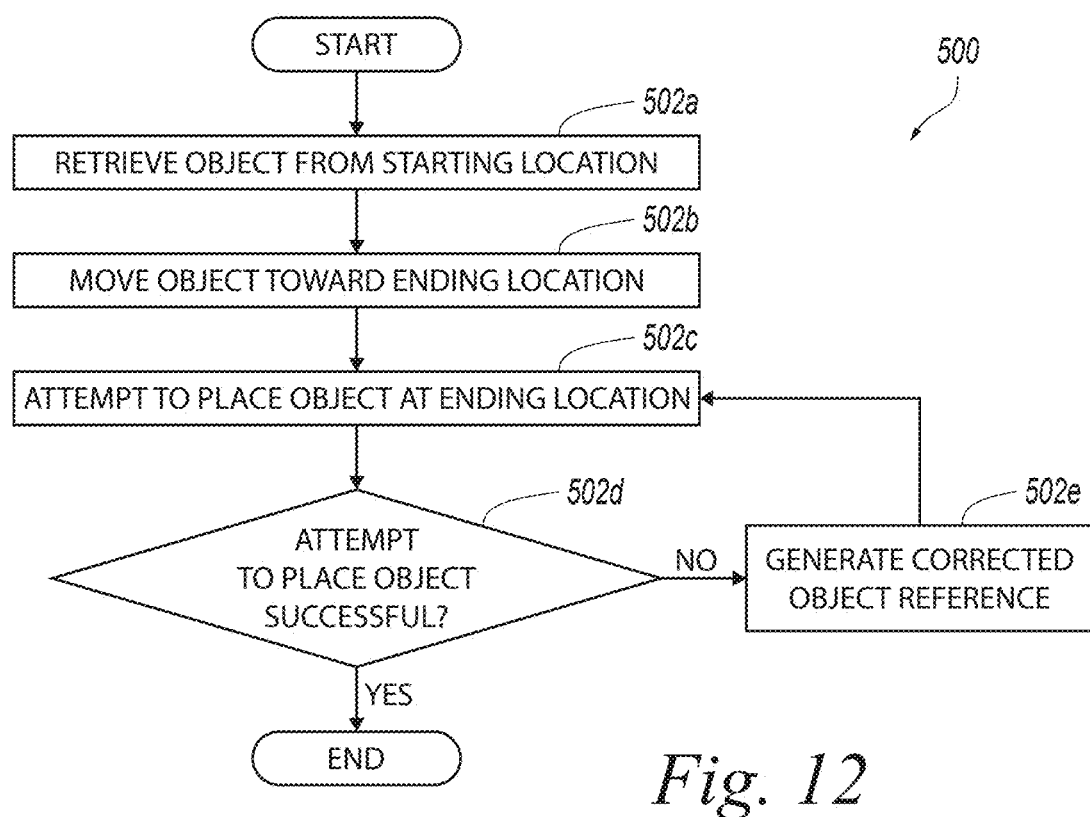
Figure 13:
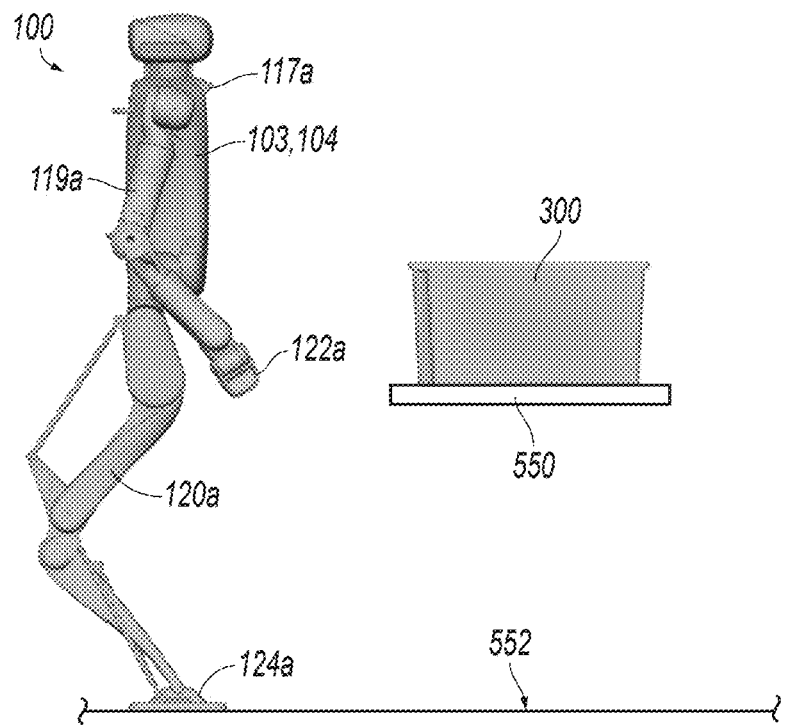
FIGS. 13-22 are side profile views of the robot of FIGS. 1-3, the object of FIGS. 7-9, and associated structures in an environment at different respective times during the methods of FIGS. 10-12.
Figure 14:
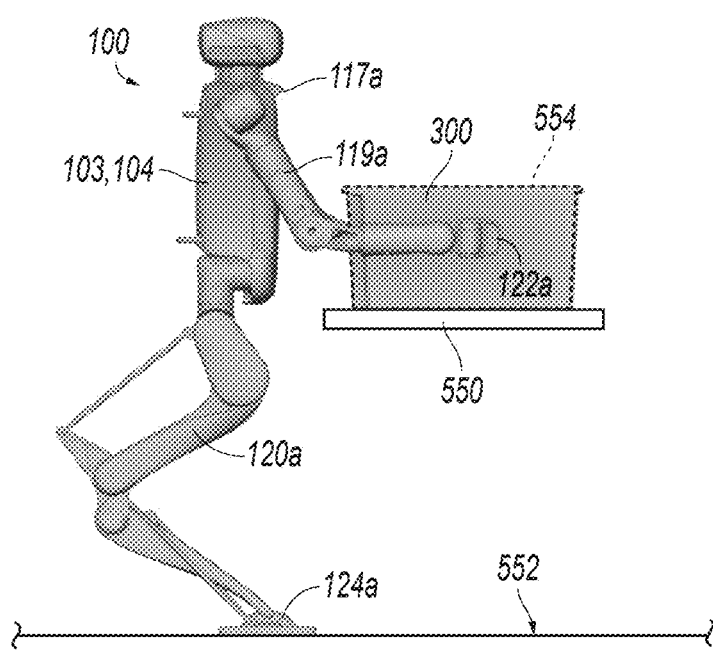
Figure 15:
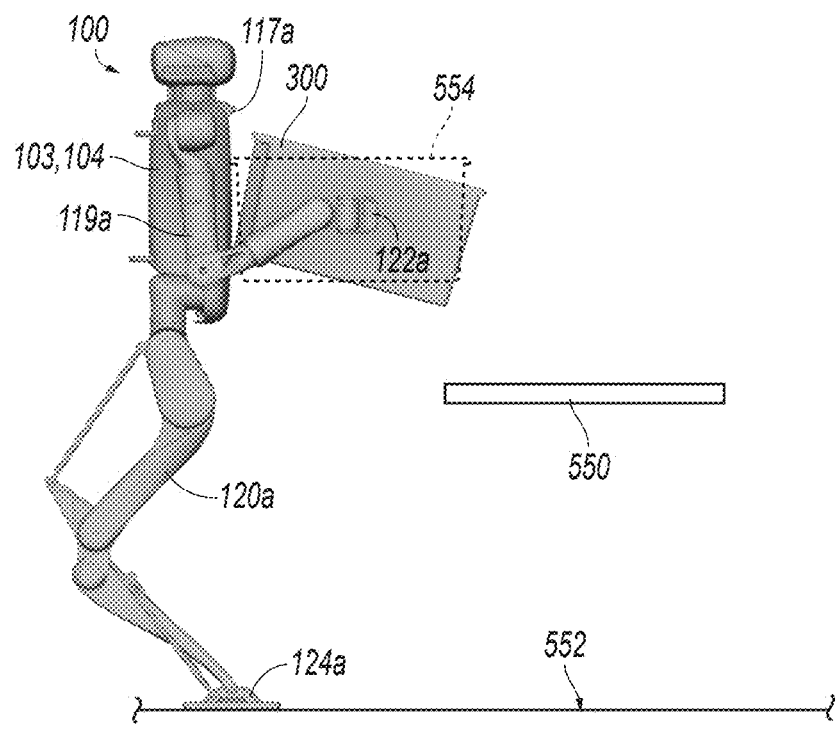

FIGS. 10-12 are block diagrams corresponding to respective methods 400, 450, 500 for relocating objects in accordance with at least some embodiments of the present technology. The diagram of FIG. 10 includes blocks 402a-402d corresponding to different respective portions of the method 400. The diagram of FIG. 11 includes blocks 452a-452e corresponding to different respective portions of the method 450. Finally, the diagram of FIG. 12 includes blocks 502a-502e corresponding to different respective portions of the method 500. FIGS. 13-22 are side profile views of the robot 100, the object 300, and associated structures in an environment at different respective times during the methods 400, 450, 500. With reference to FIGS. 1-22 together, the methods 400, 450, 500 can include retrieving the object 300 from a starting location (blocks 402a, 452a, 502a). This can occur by the robot 100 and can include contacting the object 300 and the end effectors 122a, 122b. FIGS. 13-15 illustrate an example of these portions of the methods 400, 450, 500. As shown in FIG. 13, the object 300 can begin upright on a starting support structure 550. The starting support structure 550 can be a shelf, a table, the ground, etc. The robot 100 can start facing the object 300 with the feet 124a, 124b in contact with a ground surface 552 of the environment.

Retrieving the object 300 can include moving the end effectors 122a, 122b forward to be proximate to the first and second side portions 308, 310 of the object 300, respectively, and then moving the end effectors 122a, 122b toward one another and into contact with the first and second sidewalls 320, 322 of the object 300, respectively. Once the object 300 is sufficiently supported, the robot 100 can move joints of the arms 119a, 119b and of the legs 120a, 120b to lift the object 300 from the starting support structure 550. Of course, other processes for contacting and lifting the object 300 are also possible, including processes that involve sustained or transient contact between the object 300 and only one of the end effectors 122a, 122b. Once the object 300 is retrieved, the robot 100 can carry the object 300 to an ending location as discussed below.

As shown in FIGS. 14 and 15, the robot 100 can associate the object 300 with a base object reference 554 when the end effectors 122a, 122b move into contact with the object 300. The base object reference 554 can be a pose (e.g., a six degree of freedom pose) of the object 300 relative to a known reference frame, such as a reference frame of the robot 100 or of the world. In at least some cases, the base object reference 554 is either not based on perception data for the object 300 or is not based on perception data for the object 300 after the robot 100 causes movement of the object 300. In these and other cases, the base object reference 554 can be based at least partially on a reference of a portion of the robot 100 that contacts the object 300. For example, the robot 100 can use known poses for the end effectors 122a, 122b to generate a pose for the object 300 without any need for perception data if a fixed relationship between the end effectors 122a, 122b and the object 300 is assumed. The robot 100 may determine respective poses of the end effectors 122a, 122b, for example, based on starting poses for the end effectors 122a, 122b and cumulative joint movements measured via encoders at joints of the arms 119a, 119b.

As shown in FIG. 15, the base object reference 554 and the actual pose of the object 300 may be different after the robot 100 retrieves the object 300. This difference can result, for example, from an unexpected and/or uncontrolled change in the gripping relationship between the end effectors 122a, 122b and the object 300. As discussed above, shifting between the end effectors 122a, 122b and the object 300 can occur while the robot 100 grasps the object 300, such as due to poor contact between the end effector 122a, 122b and the object 300, timing irregularities, or interaction between the object 300 and an obstruction, among other potential causes. In addition or alternatively, shifting between the end effectors 122a, 122b and the object 300 can occur after the robot 100 grasps the object 300, such as due to a collision between the object 300 and another object in the environment, strong acceleration, or shifting of contents of the object 300, among other potential causes. A mismatch between the base object reference 554 and the actual pose of the object 300 can be problematic, particularly when the robot 100 attempts to place the object 300 at an ending location.

The method 400 can further include moving the object 300 from the starting location toward an ending location by the robot 100 (block 402b) and then generating a corrected object reference corresponding to the object 300 by data-processing hardware of the system 177 (block 402c). Details of several examples of processes for generating a corrected object reference are discussed below. When a corrected object reference is available, the method 400 can include controlling the robot 100 based at least partially on the corrected object reference. The timing of generating a corrected object reference can be predetermined and/or non-predetermined. Similarly, the timing of generating a corrected object reference can be non-responsive and/or responsive. For example, the robot 100 can be configured to generate a corrected object reference automatically and shortly before taking an action that would benefit from a corrected object reference. The method 400 can include placing the object 300 at an ending location by the robot 100 (block 402d) after moving the object 300 toward the ending location and shortly after generating a corrected object reference. In at least some cases, the robot 100 moves the object 300 at least 50% of a total distance between the starting location and the ending location before generating a corrected object reference. Thus, the method 400 can include allowing a mismatch between the base object reference 554 and an actual pose of the object 300 to persist for a significant time while the robot 100 moves the object 300 toward the ending location. The mismatch may be relatively inconsequential during this time. Generating the corrected object reference after moving the object 300 toward the ending location can reduce or eliminate a need to generate a corrected object reference more than once, thereby promoting efficiency among other potential benefits.

Other methods in accordance with at least some embodiments of the present technology can include generating a corrected object reference more than once, such as once after retrieving the object 300 from a starting location and again shortly before placing the object 300 at an ending location. As shown in FIG. 11, the method 450 can include generating a corrected object reference corresponding to the object 300 by data-processing hardware of the system 177 (block 452b) and then moving the object 300 toward the ending location by the robot 100 (block 452c). In at least some cases, the robot 100 moves the object 300 at least 50% of a total distance between the starting location and the ending location after generating the corrected object reference. At an interim time while the robot 100 moves the object 300 toward the ending location, the method 450 can include generating a new corrected object reference corresponding to the object 300 by data-processing hardware of the system 177 if the robot 100 detects a potential displacement of the object 300 (block 452d). Accordingly, the method 450 can include generating the new corrected object reference responsively. The method 450 can further include placing the object 300 at the ending location by the robot 100 (block 452e) after moving the object toward the ending location and after generating the new corrected object reference, if needed.

In at least some cases, the method 450 includes receiving interim perception data corresponding to the object 300 at data-processing hardware of the system 177 at an interim time. The interim time can be a time between two times at which the robot 100 generates corrected object references and/or between a time at which the robot 100 retrieves the object 300 from a starting location and a time at which the robot 100 places the object 300 at an ending location. In addition or alternatively, the method 450 can include receiving force data corresponding to force between the object 300 and one or both of the end effectors 122a, 122b at data-processing hardware of the system 177 at the interim time. The force data can be received from one or more force sensors (not shown) at one or both of the end effectors 122a, 122b and/or from one or more force sensors at joints upstream from the end effector(s) 122a, 122b along one or more kinematic chains including the one or more joints and the end effector(s) 122a, 122b. The robot 100 can receive an indication of a displacement of the object 300 relative to one of the end effectors 122a, 122b as an excursion in the interim perception data, as an excursion in the force data, or in another suitable form. In the case of perception data, an excursion can be a detected shift (e.g., of greater than a threshold of 10%, 30%, 40%, etc.) in a tracked distance between a portion of the object 300 and a portion of the robot 100. In the case of force data, an excursion can be a detected increase or decrease (e.g., of greater than a threshold of 5%, 15%, 20%, etc.) in a tracked force at an interface between the object 300 and the corresponding one of the end effectors 122a, 122b. Other types of excursions indicative of displacement of the object 300 relative to one of the end effectors 122a, 122b are also possible.

A mismatch between the base object reference 554 and the actual pose of the object 300 is not always present after the robot 100 retrieves the object 300. For example, retrieving the object 300 may involve a prehensile grasp that rarely allows for even inadvertent relative movement between the end effectors 122a, 122b and the object 300. Accordingly, a method in accordance with at least some embodiments of the present technology can include generating a corrected object reference only if needed. In a variation of the method 450, generating the corrected object reference shortly after retrieving the object 300 can be eliminated. Similarly, as shown in FIG. 12, the method 500 can include moving the object 300 toward the ending location by the robot 100 (block 502b) and attempting to place the object 300 at the ending location by the robot 100 (block 502c) before generating a corrected object reference. The method 500 can further include determining if an attempt to place the object 300 at the ending location was unsuccessful via data-processing hardware of the system 177 (block 502d). Similarly, the method 500 can include receiving an indication that an attempt to place the object 300 at the ending location was unsuccessful via data-processing hardware of the system 177. At least partially in response to such determination and/or receipt, the method 500 can include generating a corrected object reference (block 502e) and then reattempting to place the object 300 at the ending location by the robot 100. This process can repeat until an attempt at placing the object 300 at the ending location is successful or until a maximum number of attempts is reached.

Figure 16:
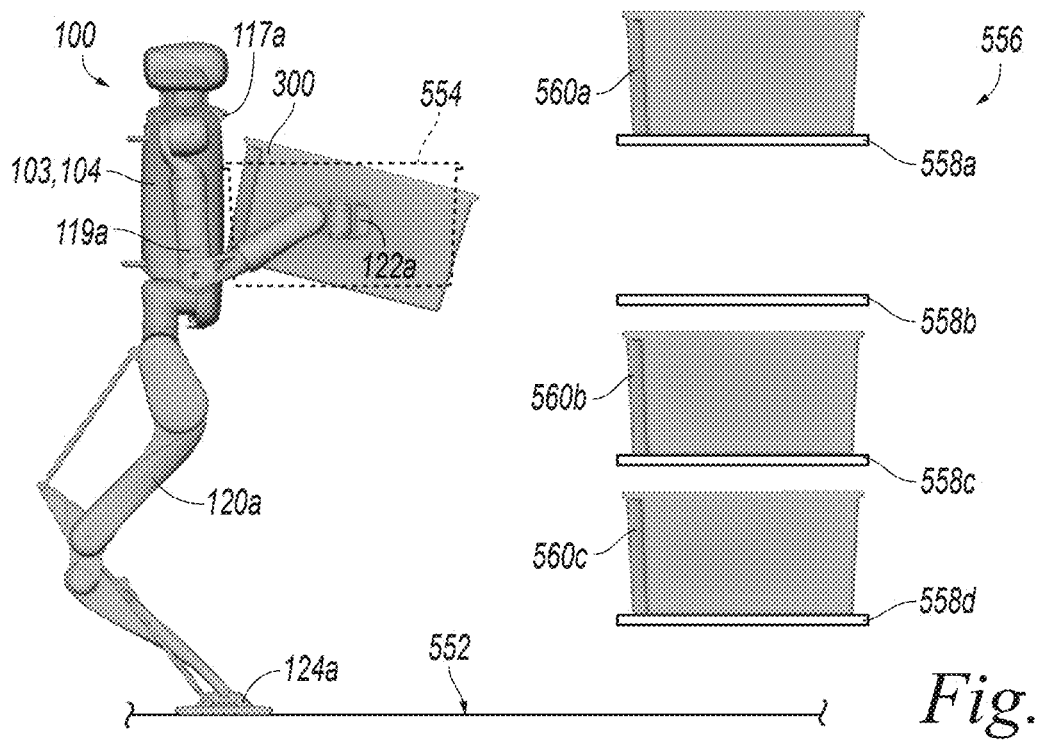
Figure 17:
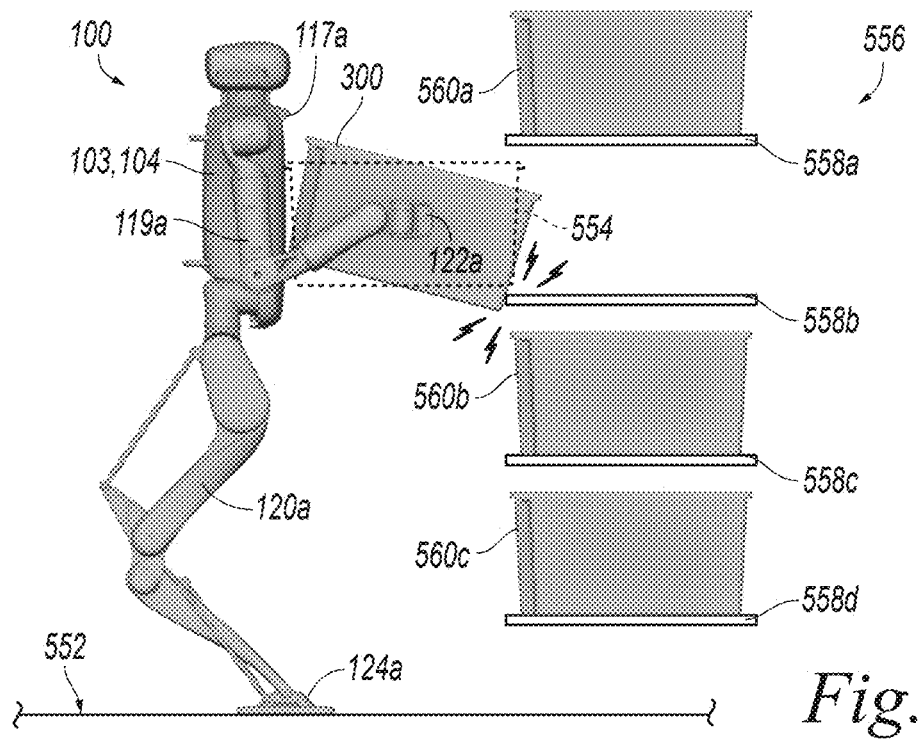
Figure 18:
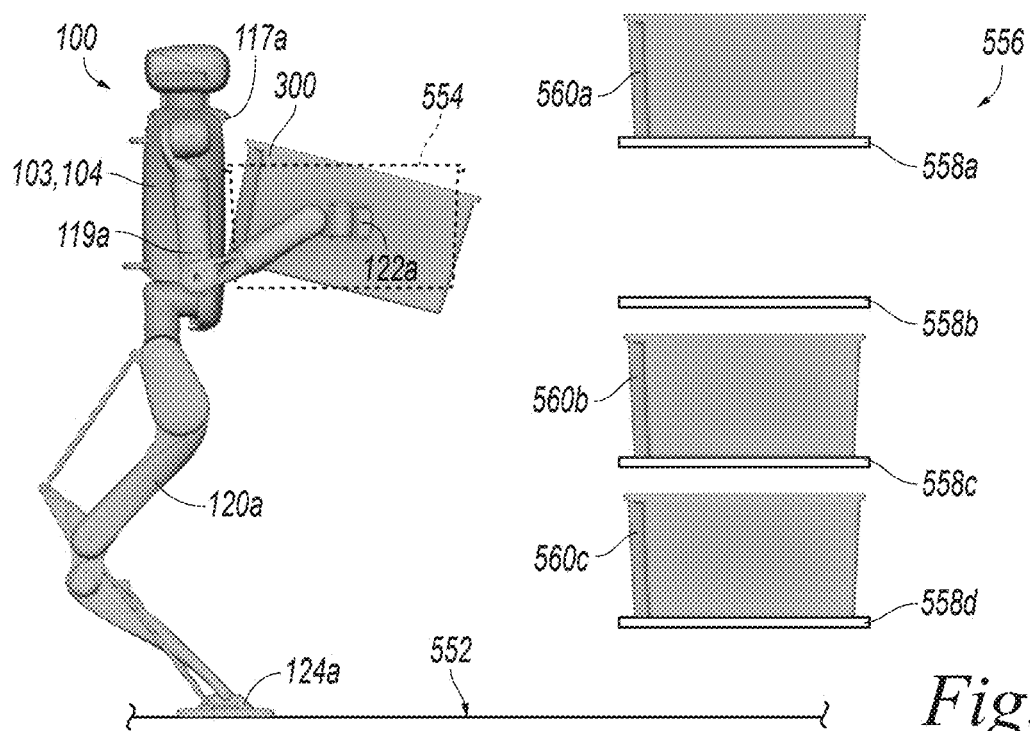
Figure 19:
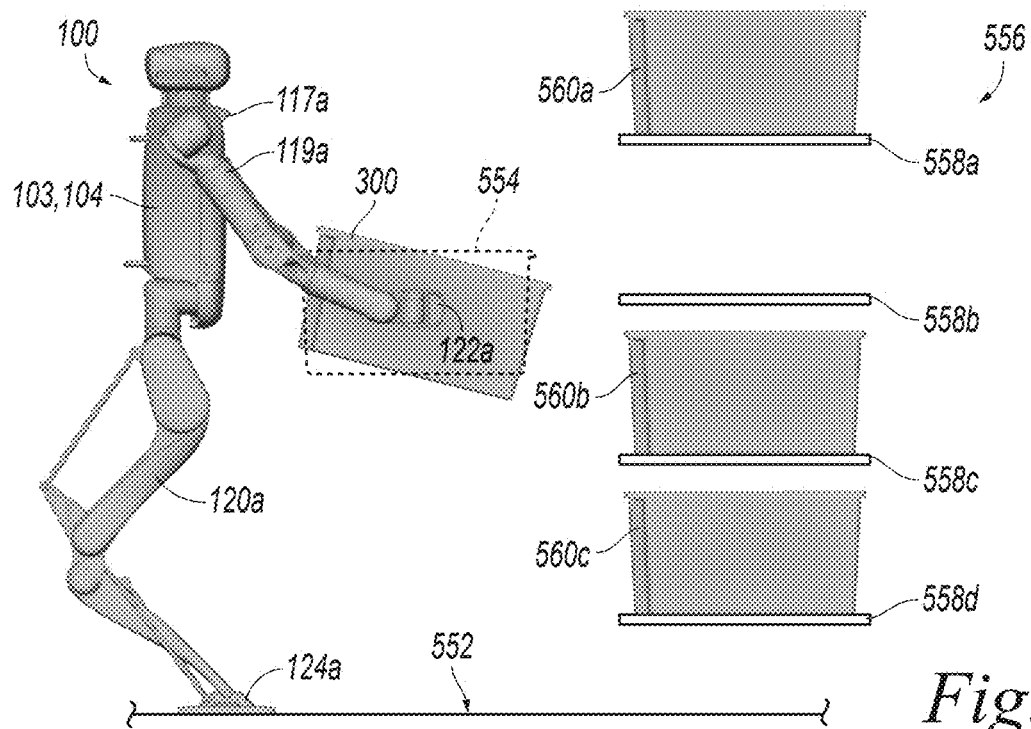
Figure 20:
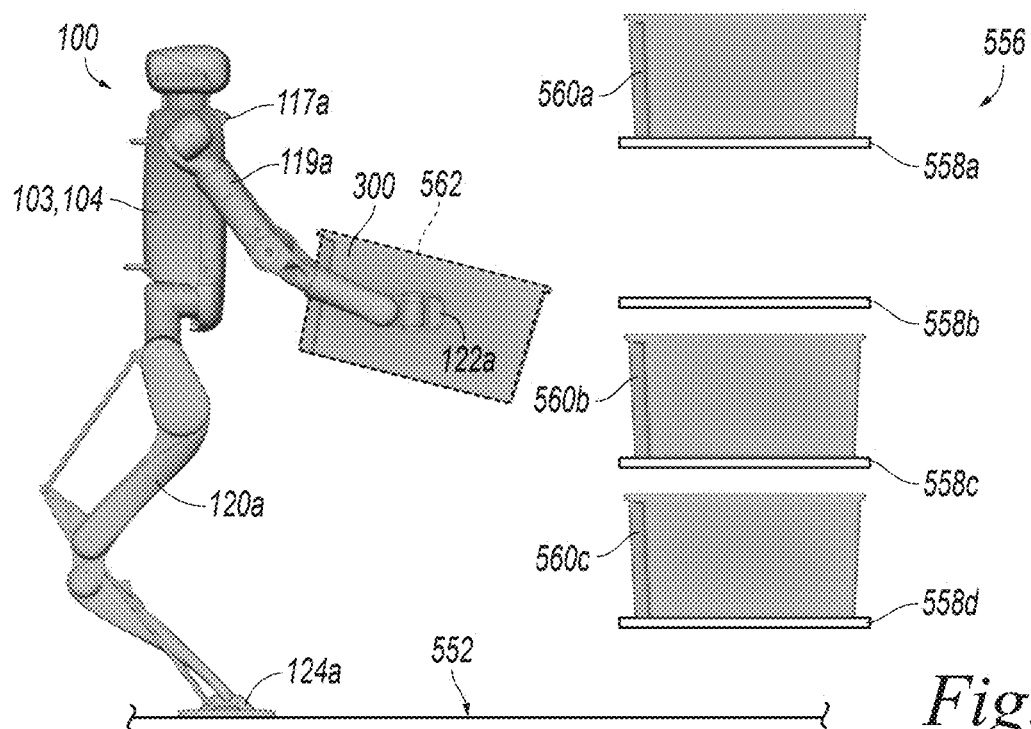
Figure 21:
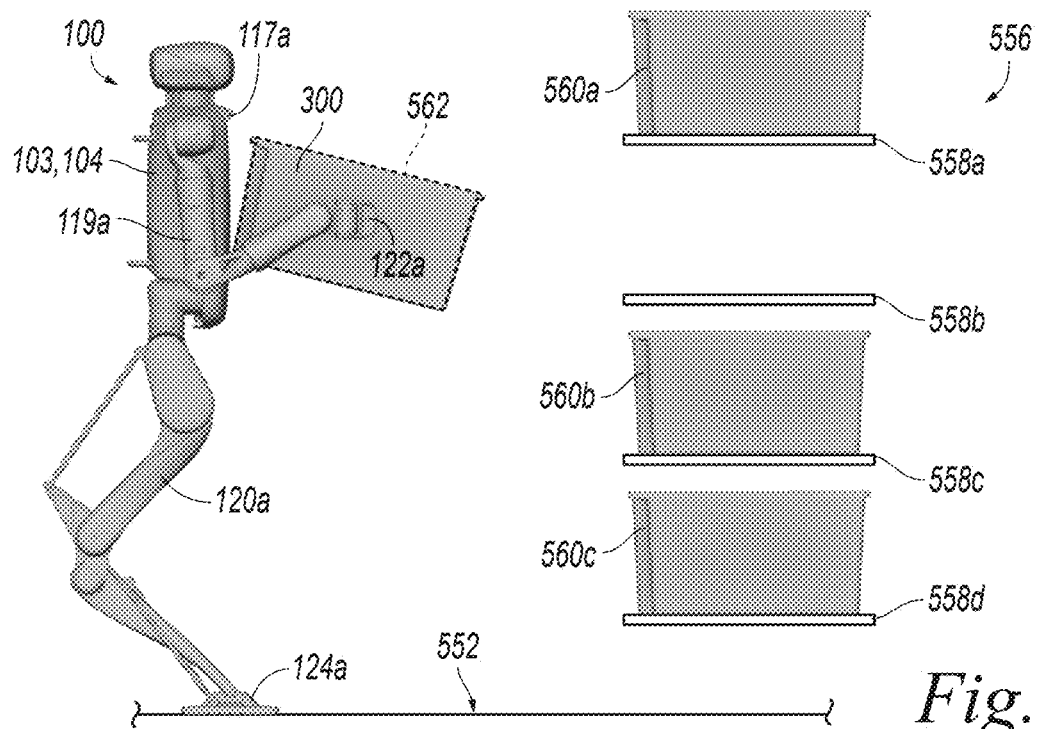
Figure 22:
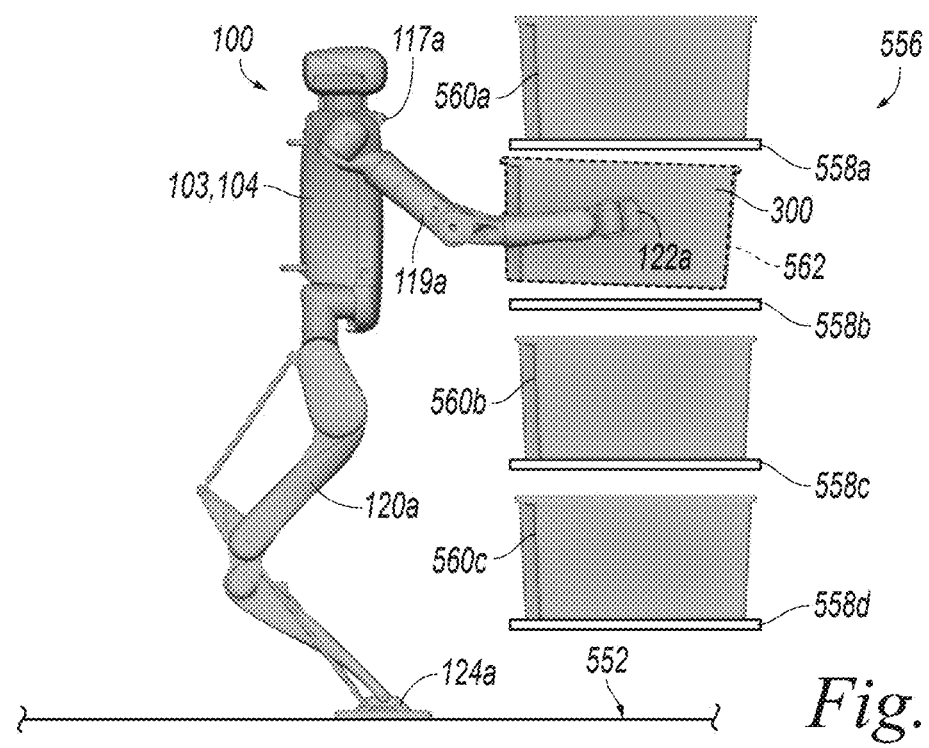

FIGS. 16-22 illustrate aspects of the method 450 in a case where a mismatch between the base object reference 554 and the actual pose of the object 300 is present and in which the robot 100 makes a single unsuccessful attempt to place the object 300 at the ending location. In FIGS. 16-22, the ending location is at an ending support structure 556 including shelves 558 (individually identified as shelves 558a-558d). The shelf 558b is unoccupied before placement of the object 300. The shelves 558a, 558c, 558d contain other objects 560 (individually identified as other objects 560a-560c) similar to the object 300. In FIG. 16, the robot 100 carries the object 300 near the ending location while a mismatch between the base object reference 554 and the actual pose of the object 300 is present. As shown in FIG. 16, a vertical clearance between neighboring pairs of the shelves 558a-558d is relatively small in this example. As shown in FIG. 17, the mismatch causes a collision between the object 300 and the shelf 558b. As also shown in FIG. 17, without the mismatch, the collision would not have occurred because the base object reference 554 is within the clearance between the shelves 558a, 558b. After the collision, the robot 100 can carry the object 300 rearward away from the shelves 558 (FIG. 18) and then extend the arms 119a, 119b to move the object 300 into a different carrying position (FIG. 19). With the object 300 at the different carrying position, the robot 100 can generate a corrected object reference 562 (FIG. 20). The robot 100 can then return the object 300 to the original carrying positon (FIG. 21) and successfully place the object 300 on the shelf 558b (FIG. 22).

Figure 23:
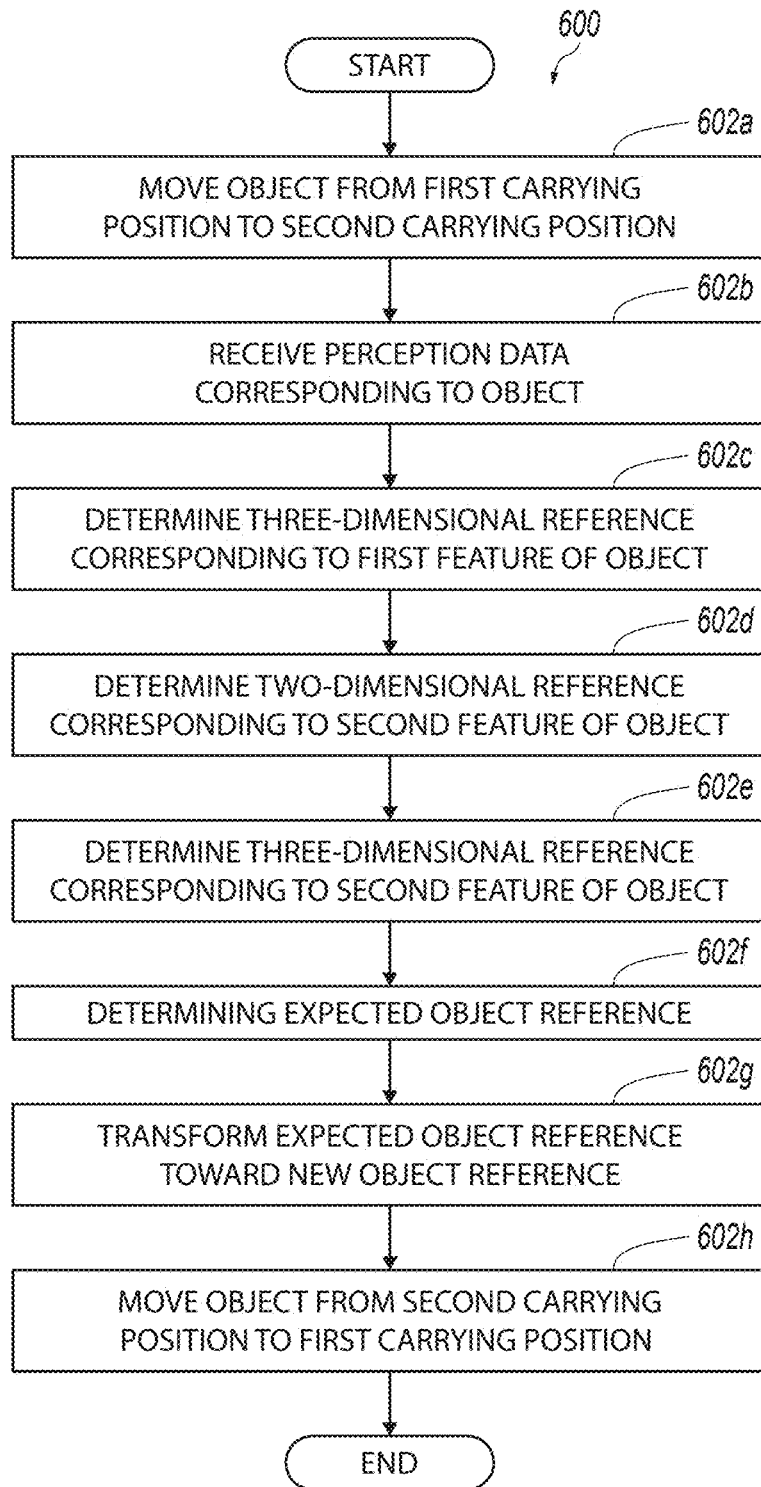
FIG. 23 is a block diagram corresponding to a method for generating an object reference in accordance with at least some embodiments of the present technology.

FIG. 23 is a block diagram corresponding to a method 600 for generating an object reference in accordance with at least some embodiments of the present technology. The object reference can be a corrected object reference, a first object reference, a second object reference, a new object reference, or an object reference of another suitable type. The method 600 can be used where generating a corrected object reference is called for in the methods 400, 450, 500 discussed above and in other contexts. The object reference can correspond to a pose (e.g., a six degree of freedom pose) of the object 300 at a time while or after the robot 100 retrieves the object 300 and while the object 300 is in contact with one or both of the end effectors 122a, 122b. Thus, the object reference can be a reference for a robot-carried object in contrast to an object reference for an object that is not robot-carried, such as an environmental object. Furthermore, generating the object reference can occur by data-processing hardware of the system 177 at any suitable time. Examples of times when the robot 100 may generate the object reference include when the robot 100 is carrying the object 300 and the object 300 is closer to an ending location than to a starting location as well as when the robot 100 is carrying the object 300 and the object 300 is closer to a starting location than to an ending location.

As shown in FIG. 23, generating the object reference can include moving the object 300 from a first carrying position to a second carrying position (block 602a). Thus, the object 300 at the time of generating the object reference can be in the second carrying position. An example of this is shown in FIGS. 18 and 19 above. In at least some cases, the second carrying position is better suited than the first carrying position to the gathering of useful perception data for generating an object reference. In these and other cases, the arms 119a, 119b can be more extended when the object 300 is in the second carrying position than when the object 300 is in the first carrying position. Moving the object 300 from the first carrying position to the second carrying position can include extending the arms 119a, 119b such that the end effectors 122a, 122b move anteriorly and inferiorly relative to the body 103. Generating the object reference can further include receiving perception data corresponding to the object 300 at data-processing hardware of the system 177 (block 602b). The perception data can correspond to the object 300 while the robot 100 carries the object 300 between the end effectors 122a, 122b, such as in the second carrying position. Indeed, moving the object 300 from the first carrying position to the second carrying position can be a trigger for or otherwise influence collecting perception data for generating an object reference. The perception data can be received via the sensor components 189, including via one or more of the two-dimensional sensors 250 and/or via one or more of the three-dimensional sensors 252. In at least some cases, the perception data is received at least primarily via one or more sensors at the sensor bay 117a, which have fields of view well suited to receiving perception data on a carried object.

Figure 24:
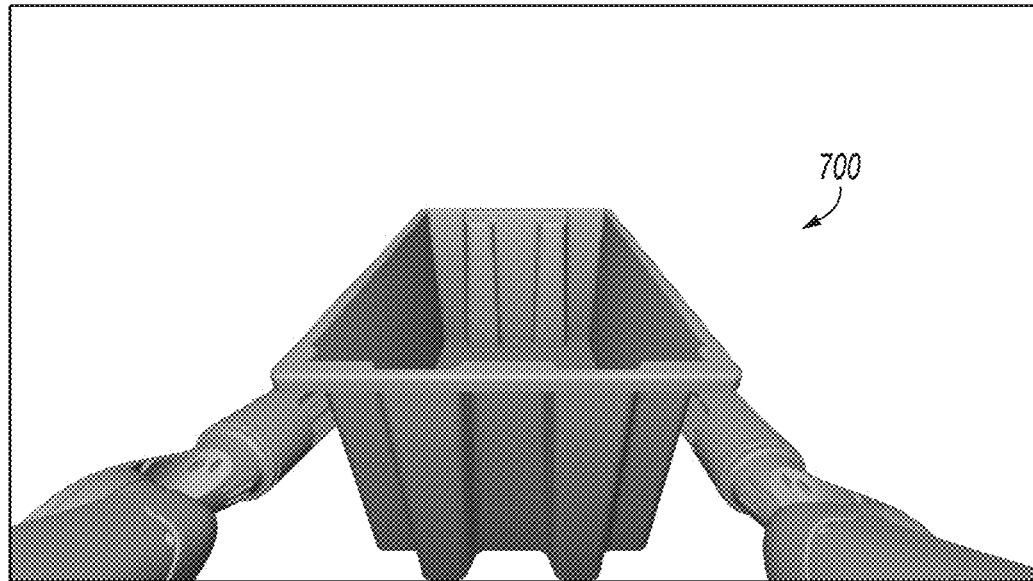
FIG. 24 is a representation of two-dimensional information corresponding to the object of FIGS. 7-9 at a time during the method of FIG. 23.
Figure 25:
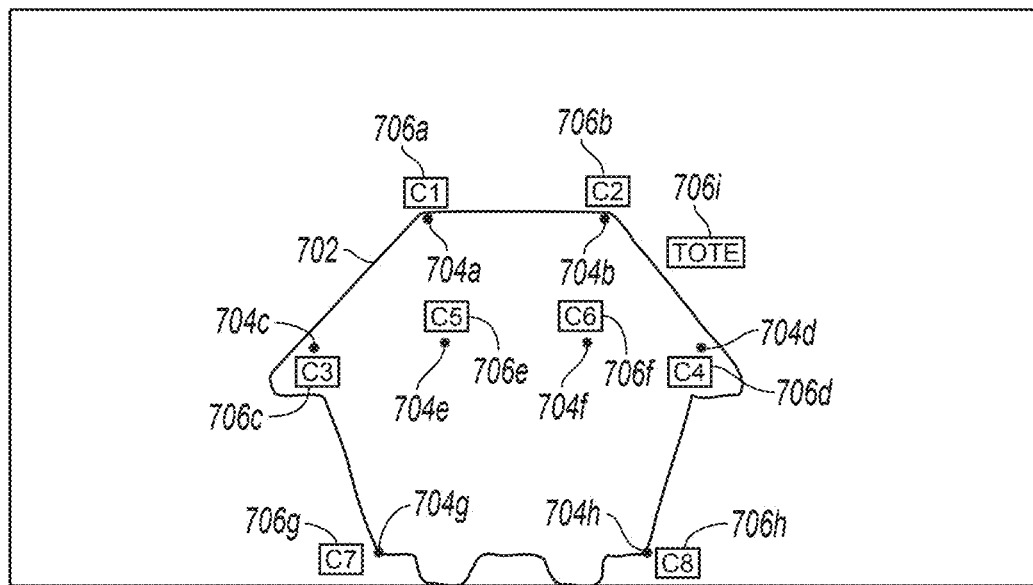
FIG. 25 is a representation of annotations corresponding to the object of FIGS. 7-9 at a time during the method of FIG. 23.
Figure 26:
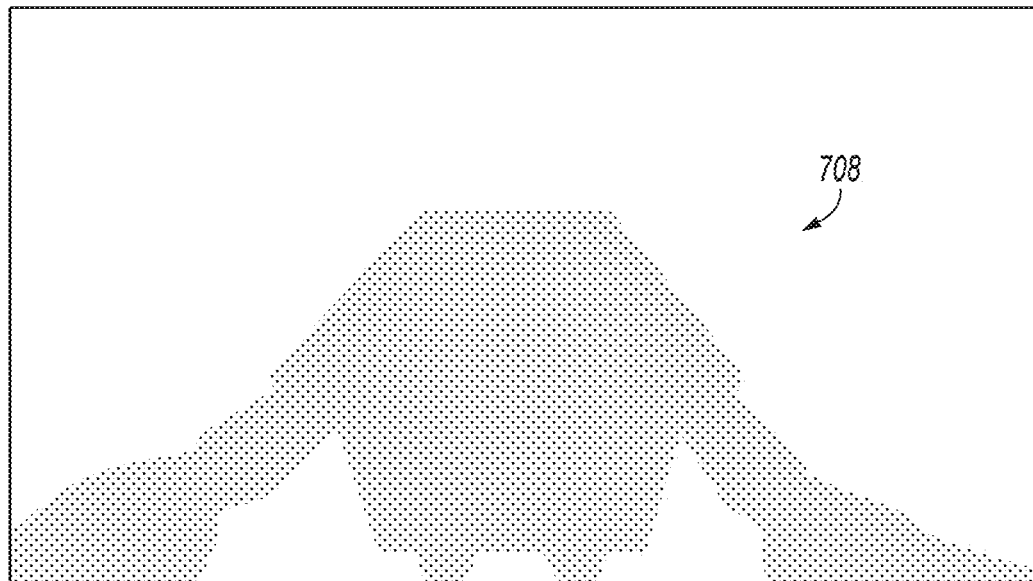
FIG. 26 is a representation of three-dimensional information corresponding to the object of FIGS. 7-9 at a time during the method of FIG. 23.
Figure 27:
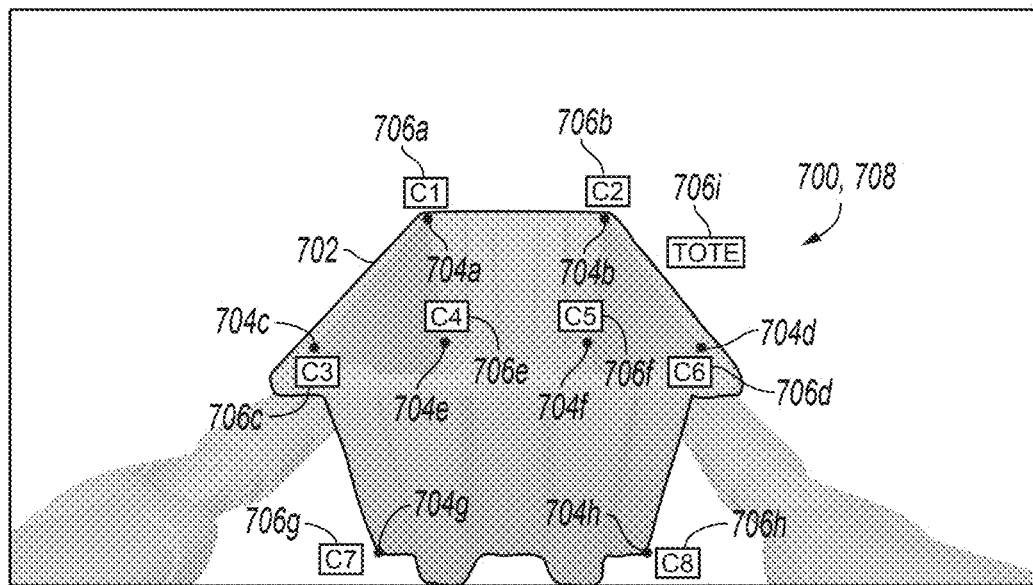
FIG. 27 is a representation of an annotated depth map corresponding to the object of FIGS. 7-9 at a time during the method of FIG. 23.

FIGS. 24-27 are representations of different types of perception data and derivatives thereof that the robot 100 can receive in connection with generating an object reference in an embodiment of the method 600. These representations correspond to the robot 100 and the object 300 as shown in FIGS. 19 and 20 with the object 300 in the second carrying position and with the perception data gathered via sensors at the sensor bay 117a. In particular, FIG. 24 is a representation of two-dimensional information corresponding to the object 300, including image pixels 700. FIG. 25 is a representation of annotations corresponding to the object 300, including a boundary estimate 702, keypoint estimates 704 (individually identified as keypoint estimates 704a-704h), and label estimates 706 (individually identified as label estimates 706a-706i). FIG. 26 is a representation of three-dimensional information corresponding to the object 300, including depth pixels 708. Finally, FIG. 27 is a representation of an annotated depth map corresponding to the object 300, including the image pixels 700, the annotations, and the depth pixels 708. With reference to FIGS. 6 and 24-27 together, the representation of FIG. 24 can correspond to an output of the two-dimensional data processor 254, the representation of FIG. 25 can correspond to an output of the neural network 258, the representation of FIG. 26 can correspond to an output of the three-dimensional data processor 256, and the representation of FIG. 27 can correspond to an output of the depth image generator 260.

The object estimator 212 can be configured to distinguish between perception data corresponding to the object 300 when carried and perception data corresponding to other objects in an environment. This can be at least partially based on an estimate from the neural network 258. For example, the annotations discussed above can include a carried-object label (not shown) that distinguishes carried objects from non-carried objects. In addition or alternatively, the object estimator 212 can use one or more heuristics to facilitate making this distinction. In some examples, the robot 100 uses non-perception information to filter out estimates for objects other than carried objects. The non-perception information can be kinematic information, such as poses of the end effectors 122a, 122b. For example, the object estimator 212 can generate an estimate for a carried object from the poses of the end effectors 122a, 122b or other suitable information as discussed above in the context of the expected reference generator 272. The object estimator 212 can then project this estimate onto the two-dimensional information to be filtered. The filtering can include comparing a boundary of the protected estimate based on the poses of the end effectors 122a, 122b to boundaries of one or more object estimates from the neural network 258. Strong correspondence can indicate that a given estimate from the neural network 258 corresponds to a carried object whereas poor correspondence can indicate that a given estimate from the neural network 258 corresponds to a non-carried object.

With reference to FIGS. 6 and 23-27 together, the method 600 can include determining a three-dimensional reference corresponding to a first feature of the object 300 based at least partially on the perception data (block 602c). In at least some cases, the first feature is a major surface of the object 300. As discussed above, the object estimator 212 can generate the boundary estimate 702 of the object 300 via the neural network 258 based at least partially on the perception data. This can be part of the process of determining the three-dimensional reference in the method 600. Determining the three-dimensional reference can further include generating surface normals corresponding to the perception data and clustering a group of the perception data based at least partially on the boundary estimate 702 and/or based at least partially on the surface normals. A corresponding example is discussed above in connection with the plane generator 262 shown in FIG. 6. In the context of the perception data and derivatives thereof shown in FIGS. 24-27, the plane generator 262 can generate surface normals for the depth pixels 708 within the boundary estimate 702, identify one or more approximately planar features in the separated depth pixels 708, and output one or more planes corresponding to the one or more approximately planar features.

The method 600 can further include determining a two-dimensional reference corresponding to a second feature of the object 300 based at least partially on the perception data (block 602d). In at least some cases, the second feature is a corner of the object 300. As discussed above, the object estimator 212 can generate a two-dimensional keypoint estimate of the object 300 via the neural network 258 based at least partially on the perception data. The two-dimensional keypoint estimate can be the two-dimensional reference corresponding to the second feature of the object in the method 600. In the context of the perception data and derivatives thereof shown in FIGS. 24-27, the keypoint estimate 704a corresponds to an inner, far, left, upper corner of the object 300, the keypoint estimate 704b corresponds to an inner, far, right, upper corner of the object 300, the keypoint estimate 704c corresponds to an inner, near, left, upper corner of the object 300, the keypoint estimate 704d corresponds to an inner, near, right, upper corner of the object 300, the keypoint estimate 704e corresponds to an inner, far, left, lower corner of the object 300, the keypoint estimate 704f corresponds to an inner, far, right, lower corner of the object 300, the keypoint estimate 704g corresponds to an outer, near, left, lower corner of the object 300, and the keypoint estimate 704h corresponds to an outer, near, right, lower corner of the object 300. Other two-dimensional keypoint estimates are also possible. For example, a counterpart of the neural network 258 can be trained to output keypoint estimates corresponding to object features other than corners, such as object markings, indentations, protrusions, etc. Furthermore, not all of the keypoint estimates 704 are necessary. The object estimator 212 may make use of all of the keypoint estimates 704 or it may make use of only one, two, three or another limited number of the keypoint estimates 704. Correspondingly, not all portions of the object 300 corresponding to the keypoint estimates 704 need to be visible for the object estimator 212 to generate an object reference.

The method 600 can still further include determining a three-dimensional reference corresponding to the second feature of the object 300 (block 602e). In at least some cases, this is based at least partially on the three-dimensional reference corresponding to the first feature of the object 300 and the two-dimensional reference corresponding to the second feature of the object 300. For example, when the first and second features of the object 300 are a major surface and a corner, respectively, the three-dimensional reference corresponding to the first feature of the object 300 can be a plane from the plane generator 262 and the two-dimensional reference corresponding to the second feature of the object 300 can be a two-dimensional keypoint estimate (e.g., one of the keypoint estimates 704) from the neural network 258. As discussed above with reference to FIG. 6, the three-dimensional feature generator 264 can use the plane to associate a two-dimensional keypoint estimate from the neural network 258 with three-dimensional information. This can include generating a ray based at least partially on the two-dimensional keypoint estimate and a reference frame of the two-dimensional sensor 250. Generating the three-dimensional reference for the second feature of the object 300 can then be based at least partially on an intersection between the ray and the plane. The intersection can then be associated with a corresponding one of the label estimates 706.

Generating the object reference can be based at least partially on the perception data (e.g., via a derivative thereof, such as the three-dimensional reference for the second feature of the object 300) and an expected object reference. Accordingly, the method 600 can further include determining an expected object reference (block 602f). The expected object reference can correspond to an expected pose of the object 300 at the time when the perception data is gathered and based at least partially on a pose of at least one of the end effectors 122a, 122b at that time. In the discussion of the object estimator 212 in the context of FIG. 6, the object reference to be generated is the fine observation from the fine observation generator 270. To distinguish it from the expected object reference, the object reference to be generated may be referred to in this discussion of FIG. 23 as the new object reference. The new object reference can be different than the expected object reference. Furthermore, the new object reference can be more accurate than the expected object reference. Generating the new object reference can include transforming the expected object reference toward the new object reference (block 602g). As discussed above in the context of FIG. 6, the expected reference generator 272 can register a model of the object 300 with a reference frame of the robot 100 based on how the object 300 should move in the absence of displacement between the object 300 and the end effectors 122a, 122b.

Figure 28:
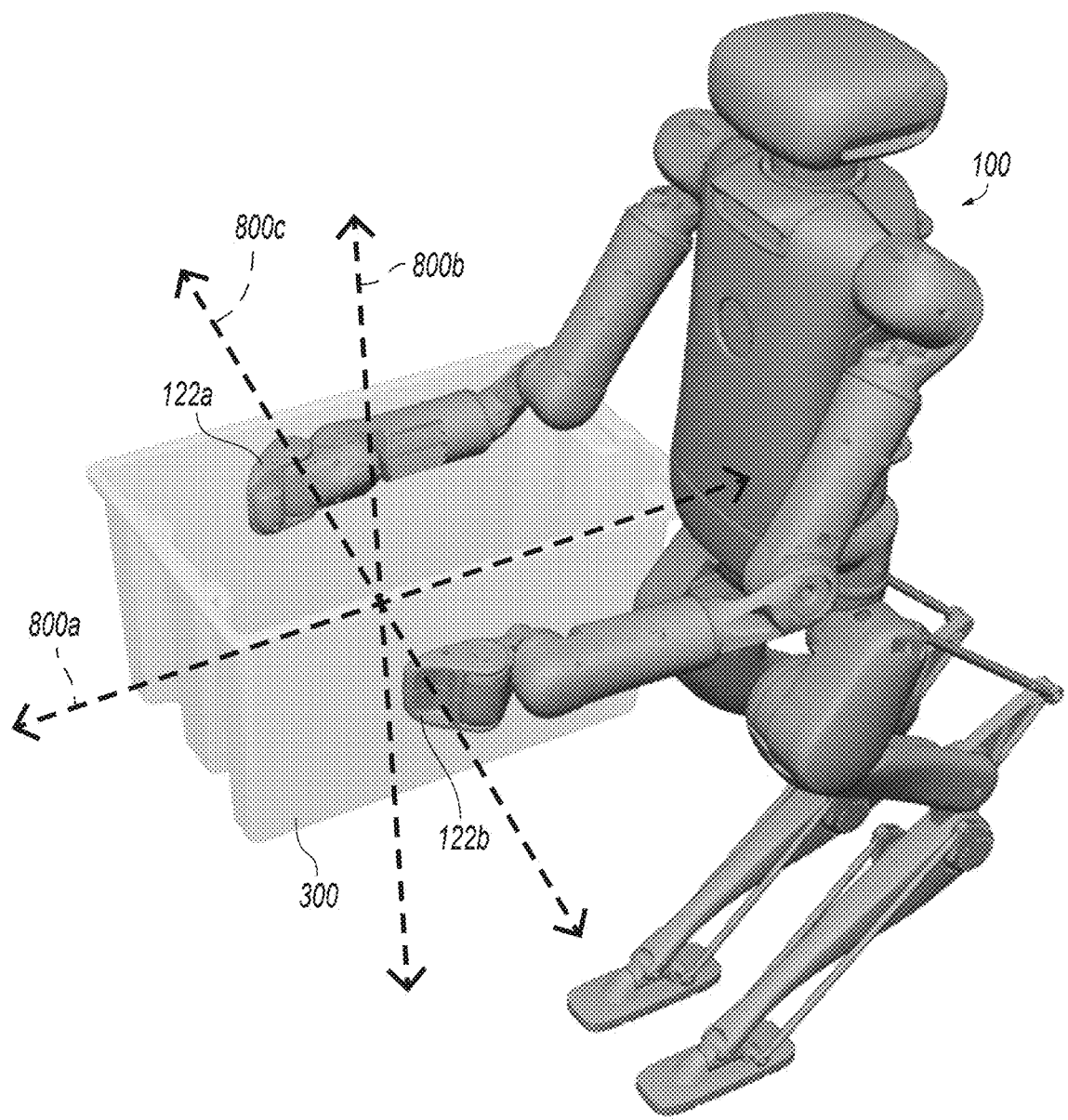
FIGS. 28 and 29 are perspective views of the robot of FIGS. 1-3, the object of FIGS. 7-9, and different respective sets of arrows indicating degrees of freedom associated with the object.
Figure 29:
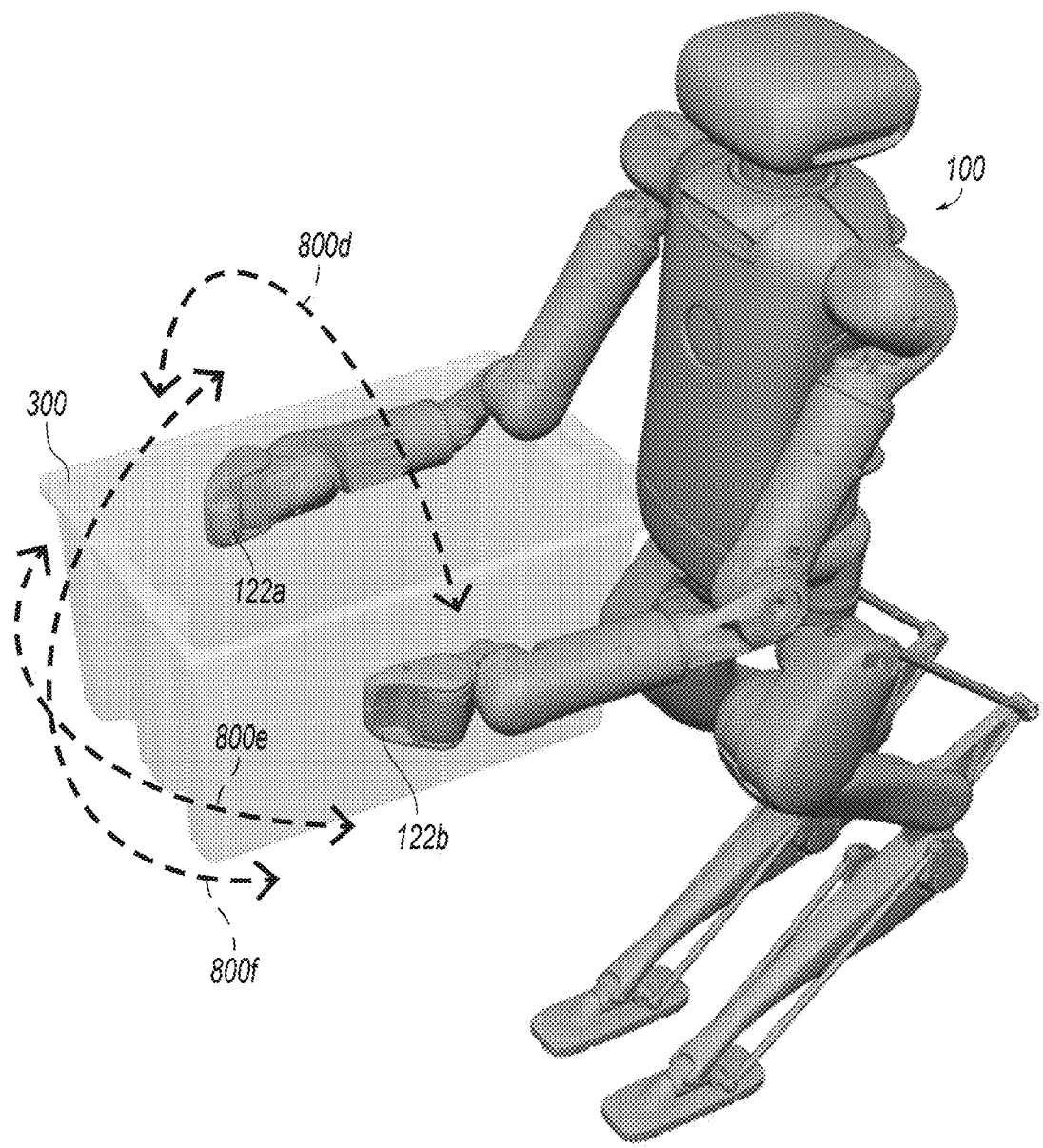

In at least some cases, transforming the expected object reference toward the new object reference occurs iteratively. Furthermore, the transforming process can differ with respect to different degrees of freedom of the object 300. FIGS. 28 and 29 are perspective views of the robot 100, the object 300, and different respective sets of arrows 800

(individually identified as arrows 800*a*-800*f*) indicating degrees of freedom associated with the object 300. In particular, the arrows 800*a*-800*c* (FIG. 28) indicate first, second, and third degrees of freedom of the object 300, respectively, and the arrows 800*d*-800*f* (FIG. 29) indicate fourth, fifth, and sixth degrees of freedom of the object 300, respectively. Without wishing to be limited to a particular naming convention, the arrows 800*a*, 800*b*, 800*c* (FIG. 28) can correspond to forward/backward, up/down, and left/right movement of the object 300, respectively. Again without wishing to be limited to a particular naming convention, the arrows 800*d*, 800*e*, 800*f* (FIG. 29) can correspond to roll, yaw, and pitch of the object 300, respectively. Furthermore, the degree of freedom corresponding to the arrow 800*c* can be parallel to a straight line between the end effectors 122*a*, 122*b* while the robot 100 carries the object 300 between the end effectors 122*a*, 122*b*. The degrees of freedom corresponding to the arrows 800*a*, 800*b* can be perpendicular to this straight line. Similarly, the degree of freedom corresponding to the arrow 800*f* can be along a circumferential axis about the straight line between the end effectors 122*a*, 122*b* while the robot 100 carries the object 300 between the end effectors 122*a*, 122*b*. The degrees of freedom corresponding to the arrows 800*d*, 800*e* can be along circumferential axes about lines perpendicular to this straight line.

Generating the new object reference can include transforming the expected object reference toward the new object reference preferentially along one or more degrees of freedom of the object 300 relative to one or more other degrees of freedom of the object 300. Restricting, limiting, or otherwise preferencing the transformation in this way can have advantages, such as reducing computing resources, increasing speed, and/or increasing the accuracy of the new object reference, among others. The preferential relationship can be based at least partially on an expectation for displacement of the object 300 relative to the end effectors 122*a*, 122*b*. For example, in the illustrated case, displacement during retrieval of the object 300 is more likely in the degrees of freedom corresponding to the arrows 800*a*, 800*b*, and 800*f* relative to the degrees of freedom corresponding to the arrows 800*c*, 800*d*, and 800*e*. Accordingly, transforming the expected object reference toward the new object reference can occur preferentially along the degrees of freedom corresponding to the arrows 800*a*, 800*b*, and 800*f* than in the degrees of freedom corresponding to the arrows 800*c*. 800*d*, and 800*e* after retrieving the object 300 and at other suitable times. In at least some cases, preferentially transforming includes constraining iterations of a matching algorithm. For example, an iterative closest point algorithm can be constrained to generating iterations that line along a plane defined by the end effectors 122*a*, 122*b*.

Other relationships are also possible in addition to or instead of the foregoing relationships. Furthermore, not all relationships are necessarily accounted for in a given transformation. For example, transforming the expected object reference toward the new object reference can occur preferentially along a rotational axis relative to another rotational axis, along a translational axis relative to another translational axis, along a rotational axis relative to a translational axis, and/or along a translational axis relative to a rotational axis. As additional examples, transforming the expected object reference toward the new object reference can occur preferentially along the degree of freedom corresponding to the arrow 800*a* relative to the degree of freedom corresponding to the arrow 800*c*, along the degree of freedom corresponding to the arrow 800*b* relative to the degree of freedom corresponding to the arrow 800*c*, along the degree of freedom corresponding to the arrow 800*f* relative to the degree of freedom corresponding to the arrow 800*d*, along the degree of freedom corresponding to the arrow 800*f* relative to the degree of freedom corresponding to the arrow 800*e*, and/or along the degree of freedom corresponding to the arrow 800*b* relative to the degree of freedom corresponding to the arrow 800*d*.

Transforming the expected object reference can be based at least partially on a rough object reference based on the perception data. In the discussion of the object estimator 212 in the context of FIG. 6, the rough object reference is the rough estimate from the rough observation generator 266. As discussed above in the context of FIG. 6, the rough observation generator 266 can register an object model from the object model library 268 to a reference frame of the robot 100 based at least partially on correspondence between the object model and information from the three-dimensional feature generator 264. The registration, for example, can be based at least partially on matching keypoints and labels of the object model with corresponding three-dimensional keypoints and labels from the three-dimensional feature generator 264. The new object reference can be based at least partially on the expected object reference and the rough object reference. For example, the fine observation generator 270 can be configured to use the expected reference from the expected reference generator 272 and the rough estimate from the rough observation generator 266 to generate the new object reference. This can occur via a matching algorithm, such as an iterative closest point algorithm. It should be noted that although a transformation may be discussed herein as being from one reference to another reference, this is a simplification for purposes of discussion. In such a transformation, the object reference from which the transformation occurs is one input. Other inputs may exist. For example, a matching algorithm may have an expected object reference and a rough object reference as inputs and the new object reference as an output. In such a case, the matching algorithm may transform both the expected object reference and the rough object reference toward the new object reference.

After generating the new object reference, the method 600 can include moving the object 300 from the second carrying position to the first carrying position (block 602*h*). An example of this is shown in FIGS. 20 and 21. In at least some cases, the first carrying position is better suited than the second carrying position to efficiently transporting the object 300. Moving the object 300 from the second carrying position to the first carrying position can include retracting the arms 119*a*, 119*b* such that the end effectors 122*a*. 122*b* move posteriorly and superiorly relative to the body 103. After generating the new object reference, the robot 100 may continue manipulating the object 300 without generating another new object reference. Alternatively, the robot 100 may generate a second new object reference at a second time after generating a first new object reference as a first time. The process for generating the second object reference can be similar to the process for generating the first object reference. In at least some cases, however, the expected object reference can be replaced with the first new object reference in the process for generating the second new object reference. With regard to generating a single new object reference or any instance of generating multiple object references, the process can be at a certain time or in response to a trigger. As discussed above, examples of triggers include receiving an indication that attempting to place the object 300 at an ending location was unsuccessful (e.g., due to the collision shown in FIG. 17) and/or receiving another indication that a displacement of the object 300 has or is likely to have occurred.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may be disclosed herein in the context of those embodiments, other embodiments may also exhibit such advantages, and not all embodiments need necessarily exhibit such advantages or other advantages disclosed herein to fall within the scope of the present technology. This disclosure and the associated technology can encompass other embodiments not expressly shown or described herein.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Any reference herein to "the inventors" means at least one inventor of the present technology. As used herein, the terms "generally," "substantially," "about," and similar terms are used as terms of approximation and not as terms of degree, and are intended to account for the inherent variations in measured or calculated values that would be recognized by those of ordinary skill in the art. Additionally, the terms "comprising," "including," "having," and the like are used throughout this disclosure to mean including at least the recited feature(s) such that any greater number of the same feature(s) and/or one or more additional types of features are not precluded. This is the case even if a particular number of features is specified unless that specified number is preceded by the word "exactly" or another clear indication that it is intended to be closed ended. In a particular example, "comprising two arms" means including at least two arms.

Directional terms, such as "upper," "lower," "front," "back," "vertical," and "horizontal," may be used herein to express and clarify the relationship between various structures. It should be understood that such terms do not denote absolute orientation. The term "centroid" as used herein refers to a center-like data element for a given shape in three-dimensional space. There are several known approaches to calculating centroids including approaches of greater and lesser precision. No particular approach is contemplated herein. Reference herein to "one embodiment," "an embodiment," or similar phrases means that a particular feature, structure, or operation described in connection with such phrases can be included in at least one embodiment of the present technology. Thus, such phrases as used herein are not all referring to the same embodiment. Unless preceded with the word "conventional," reference herein to "counterpart" devices, systems, methods, features, structures, or operations refers to devices, systems, methods, features, structures, or operations in accordance with at least some embodiments of the present technology that are similar to a described device, system, method, feature, structure, or operation in certain respects and different in other respects. Finally, it should be noted that various particular features, structures, and operations of the embodiments described herein may be combined in any suitable manner in additional embodiments in accordance with the present technology.

We claim:

1. A method comprising:
retrieving, by a mobile robot, an object from a starting location, wherein retrieving the object includes contacting the object and an end effector of the mobile robot; and
generating, by data-processing hardware operably associated with the mobile robot, an object reference corresponding to a pose of the object at a time after retrieving the object and while the object is in contact with the end effector,
wherein generating the object reference includes:
receiving, at the data-processing hardware, perception data corresponding to the object at the time,
determining, by the data-processing hardware and based at least partially on the perception data, a three-dimensional reference corresponding to a first feature of the object,
determining, by the data-processing hardware and based at least partially on the perception data, a two-dimensional reference corresponding to a second feature of the object,
determining, by the data-processing hardware and based at least partially on the three-dimensional reference corresponding to the first feature and the two-dimensional reference corresponding to the second feature, a three-dimensional reference corresponding to the second feature, and
generating the object reference based at least partially on the three-dimensional reference corresponding to the second feature.

2. The method of claim 1, wherein:
the first feature is a major surface of the object; and
the second feature is a corner of the object.

3. The method of claim 1, wherein determining the three-dimensional reference corresponding to the first feature includes:
generating, by the data-processing hardware, surface normals corresponding to the perception data; and
clustering, by the data-processing hardware, a group of the perception data based at least partially on the surface normals.

4. The method of claim 3, wherein:
determining the three-dimensional reference corresponding to the first feature includes generating, by a neural network of the data-processing hardware and based at least partially on the perception data, an estimate of a boundary of the object; and
clustering the group of the perception data includes clustering the group of the perception data based at least partially on the boundary.

5. The method of claim 1, wherein:
receiving the perception data includes receiving, from an image sensor of the mobile robot, image data corresponding to the object at the time;
the two-dimensional reference corresponding to the second feature is a two-dimensional keypoint estimate corresponding to the second feature; and
determining the two-dimensional keypoint estimate corresponding to the second feature includes generating, by a neural network of the data-processing hardware and based at least partially on the image data, the two-dimensional keypoint estimate.

6. The method of claim 5, wherein determining the three-dimensional reference corresponding to the second feature includes:
generating a ray based at least partially on the two-dimensional keypoint estimate and a reference frame of the image sensor; and
determining the three-dimensional reference corresponding to the second feature based at least partially on an intersection between the ray and the three-dimensional reference corresponding to the first feature.

7. The method of claim 1, further comprising:
moving, by the mobile robot, the object from the starting location toward an ending location; and
placing, by the mobile robot, the object at the ending location after moving the object toward the ending location,
wherein the object at the time is closer to the ending location than to the starting location.

8. The method of claim 1, further comprising:
moving, by the mobile robot, the object from the starting location toward an ending location;
attempting to place, by the mobile robot, the object at the ending location after moving the object toward the ending location;
receiving, at the data-processing hardware, an indication that attempting to place the object at the ending location was unsuccessful, wherein generating the object reference includes generating the object reference at least partially in response to receiving the indication that attempting to place the object at the ending location was unsuccessful; and
reattempting to place, by the mobile robot, the object at the ending location after generating the object reference.

9. The method of claim 1, further comprising receiving at the data-processing hardware, an indication of a displacement of the object relative to the end effector, wherein generating the object reference includes generating the object reference at least partially in response to receiving the indication of the displacement.

10. The method of claim 9, further comprising:
placing, by the mobile robot, the object at an ending location; and
receiving, at the data-processing hardware, interim perception data corresponding to the object at an interim time between retrieving the object and placing the object, wherein the indication of the displacement is an excursion in the interim perception data.

11. The method of claim 1, wherein:
the object reference is a corrected object reference;
generating the corrected object reference includes:
determining, by the data-processing hardware, an expected object reference corresponding to an expected pose of the object at the time, and
generating the corrected object reference based at least partially on the perception data and the expected object reference; and
the corrected object reference is more accurate than the expected object reference.

12. The method of claim 11, wherein determining the expected object reference includes determining the expected object reference based at least partially on a pose of the end effector at the time.

13. The method of claim 11, wherein generating the object reference includes:
determining, by the data-processing hardware and based at least partially on the perception data, a rough object reference; and
generating the corrected object reference at least partially via a matching algorithm in which the rough object reference and the expected object reference are inputs.

14. The method of claim 11, wherein generating the corrected object reference includes transforming the expected object reference toward the corrected object reference.

15. The method of claim 14, wherein transforming the expected object reference toward the corrected object reference includes transforming the expected object reference toward the corrected object reference along a first degree of freedom of the object preferentially relative to transforming the expected object reference toward the corrected object reference along a second degree of freedom of the object.

16. The method of claim 15, wherein:
the end effector is a first end effector;
the mobile robot includes a second end effector;
the perception data corresponds to the object while the mobile robot carries the object between the first and second end effectors at the time;
the first degree of freedom is along a first translational axis perpendicular to a straight line between the first and second end effectors while the mobile robot carries the object between the first and second end effectors at the time; and
the second degree of freedom is along a second translational axis parallel to the straight line between the first and second end effectors while the mobile robot carries the object between the first and second end effectors at the time.

17. The method of claim 15, wherein:
the end effector is a first end effector;
the mobile robot includes a second end effector;
the perception data corresponds to the object while the mobile robot carries the object between the first and second end effectors at the time;
the first degree of freedom is along a circumferential axis about a straight line between the first and second end effectors while the mobile robot carries the object between the first and second end effectors at the time; and
the second degree of freedom is along a translational axis parallel to the straight line between the first and second end effectors while the mobile robot carries the object between the first and second end effectors at the time.

18. The method of claim 15, wherein:
the end effector is a first end effector;
the mobile robot includes a second end effector;
the perception data corresponds to the object while the mobile robot carries the object between the first and second end effectors at the time;
the first degree of freedom is along a first circumferential axis about a first straight line between the first and second end effectors while the mobile robot carries the object between the first and second end effectors at the time; and the second degree of freedom is along a second circumferential axis about a second straight line perpendicular to the first straight line while the mobile robot carries the object between the first and second end effectors at the time.

19. The method of claim 1, wherein:

the end effector is a first end effector;

the mobile robot includes:
- a second end effector,
- a body,
- a first arm proximally connected to the body and distally carrying the first end effector, and
- a second arm proximally connected to the body and distally carrying the second end effector;

generating the object reference includes:
- moving the object from a first carrying position to a second carrying position in which the first and second arms are more extended than in the first carrying position, and
- moving the object from the second carrying position to the first carrying position after moving the object from the first carrying position to the second carrying position; and the object at the time is in the second carrying position.

20. The method of claim 1, wherein:

the end effector is a first end effector;

the mobile robot includes a second end effector; and the perception data corresponds to the object while the mobile robot carries the object between the first and second end effectors at the time.

* * * * *